United States Patent
Abdul-Hak et al.

(10) Patent No.: US 12,073,668 B1
(45) Date of Patent: Aug. 27, 2024

(54) MACHINE-LEARNED MODELS FOR ELECTRIC VEHICLE COMPONENT HEALTH MONITORING

(71) Applicant: Mercedes-Benz Group AG, Stuttgart (DE)

(72) Inventors: Mohamad Abdul-Hak, Ann Arbor, MI (US); Agasthya Ayachit, Troy, MI (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/331,782

(22) Filed: Jun. 8, 2023

(51) Int. Cl.
  *G07C 5/08* (2006.01)
  *G06N 3/02* (2006.01)
  *G06N 3/04* (2023.01)
  *G07C 5/00* (2006.01)

(52) U.S. Cl.
  CPC .......... *G07C 5/0816* (2013.01); *G06N 3/04* (2013.01); *G07C 5/006* (2013.01); *G07C 5/008* (2013.01)

(58) Field of Classification Search
  CPC .......... G06N 20/00; G06N 3/04; G07C 5/006; G07C 5/008; G07C 5/08; G07C 5/0816; G07C 5/12
  See application file for complete search history.

(56) References Cited

U.S. PATENT DOCUMENTS

| 5,574,352 | A | 11/1996 | Endo et al. |
| 10,725,084 | B2 | 7/2020 | He et al. |
| 10,937,259 | B1 | 3/2021 | Horvatich et al. |
| 11,130,422 | B1 | 9/2021 | Goldfarb et al. |
| 11,296,594 | B2 * | 4/2022 | Deguchi ............ H02M 1/32 |

(Continued)

FOREIGN PATENT DOCUMENTS

| AU | 2021102724 A4 | 7/2021 |
| CN | 103036467 A | 4/2013 |

(Continued)

OTHER PUBLICATIONS

Prytz, "Machine learning methods for vehicle predictive maintenance using off-board and on-board data", Halmstead University Press, 2014, 96 pages.

(Continued)

*Primary Examiner* — Peter D Nolan
*Assistant Examiner* — Ce Li Li
(74) *Attorney, Agent, or Firm* — Dority & Manning, P.A.

(57) ABSTRACT

Methods, computing systems, and technology for machine-learned vehicle component health monitoring are presented. An example method may include obtaining operating data describing one or more operational characteristics of a component of a subsystem onboard a vehicle. The example method may include generating, using a component longevity model and based on the operating data, a component longevity value for the component. The example method may include generating, using a vehicle usage model and based on the component longevity value, a prognosis for the component. In the example method, the vehicle usage model may be configured to evaluate the component longevity value based on a usage pattern associated with the vehicle. The example method may include initiating, based on the prognosis, a corrective action to mitigate degradation of the component.

20 Claims, 8 Drawing Sheets

(56) References Cited

U.S. PATENT DOCUMENTS

| | | | |
|---|---|---|---|
| 11,387,654 | B2 | 7/2022 | Gadh et al. |
| 11,535,107 | B2 | 12/2022 | Lin et al. |
| 11,548,372 | B2 | 1/2023 | Yao et al. |
| 2003/0114965 | A1 | 6/2003 | Fiechter et al. |
| 2005/0278146 | A1 | 12/2005 | Nitsche et al. |
| 2013/0231826 | A1* | 9/2013 | Zhang .................. G06Q 10/20 701/29.3 |
| 2017/0117841 | A1 | 4/2017 | Watanabe et al. |
| 2017/0212012 | A1 | 7/2017 | Unama et al. |
| 2018/0202398 | A1* | 7/2018 | Jammoussi .......... F02M 35/104 |
| 2018/0276546 | A1 | 9/2018 | Joshi et al. |
| 2019/0084425 | A1 | 3/2019 | Liu et al. |
| 2019/0157869 | A1 | 5/2019 | Gadh et al. |
| 2019/0242936 | A1 | 8/2019 | He et al. |
| 2020/0064782 | A1 | 2/2020 | Li et al. |
| 2020/0207219 | A1 | 7/2020 | Slepchenkov et al. |
| 2020/0216080 | A1 | 7/2020 | Soltanian et al. |
| 2020/0274437 | A1 | 8/2020 | Deguchi |
| 2021/0018016 | A1 | 1/2021 | Kim et al. |
| 2021/0049833 | A1 | 2/2021 | Bielby et al. |
| 2021/0055352 | A1 | 2/2021 | Takahashi et al. |
| 2021/0070313 | A1 | 3/2021 | Benoit et al. |
| 2021/0261003 | A1 | 8/2021 | Zang |
| 2021/0291803 | A1 | 9/2021 | Gesang et al. |
| 2022/0069694 | A1 | 3/2022 | Rudolph et al. |
| 2022/0101666 | A1 | 3/2022 | Simonis et al. |
| 2022/0111758 | A1 | 4/2022 | Ijaz et al. |
| 2022/0115897 | A1 | 4/2022 | Ijaz |
| 2022/0203908 | A1 | 6/2022 | Bhimani et al. |
| 2022/0219548 | A1 | 7/2022 | Wang et al. |
| 2022/0266680 | A1 | 8/2022 | Yao et al. |
| 2023/0110616 | A1 | 4/2023 | Mracek et al. |
| 2023/0192063 | A1 | 6/2023 | Cronin |

FOREIGN PATENT DOCUMENTS

| | | |
|---|---|---|
| CN | 105572492 A | 5/2016 |
| CN | 106564398 A | 4/2017 |
| CN | 109591615 | 4/2019 |
| CN | 110103740 | 8/2019 |
| CN | 110667540 A | 1/2020 |
| CN | 111137171 A | 5/2020 |
| CN | 111880117 | 11/2020 |
| CN | 112910288 A | 6/2021 |
| CN | 113131768 A | 7/2021 |
| CN | 113659833 A | 11/2021 |
| CN | 113771631 | 12/2021 |
| CN | 113850154 A | 12/2021 |
| CN | 113890104 | 1/2022 |
| CN | 114194057 | 3/2022 |
| CN | 114679068 | 6/2022 |
| CN | 114757300 | 7/2022 |
| GB | 2534368 A1 | 7/2016 |
| IN | 202241039050 | 7/2022 |
| IN | 202141049000 | 4/2023 |
| JP | 8149884 A2 | 6/1996 |
| JP | 2017192277 A | 10/2017 |
| KR | 100435644 B1 | 6/2004 |
| KR | 20190115535 A | 10/2019 |
| KR | 20200094280 A | 8/2020 |
| KR | 20210055946 A | 5/2021 |
| KR | 20210142883 A | 11/2021 |
| WO | WO 2019/183553 | 9/2019 |
| WO | WO 2022116203 A1 | 6/2022 |
| WO | WO-2023014418 A1 * | 2/2023 |
| WO | WO 202372941 | 5/2023 |
| WO | WO2023102267 | 6/2023 |

OTHER PUBLICATIONS

International Search Report and Written Opinion for Application PCT/EP2024/058518, mailed Jul. 15, 2024, 13 pages.

* cited by examiner

MACHINE-LEARNED MODELS FOR ELECTRIC VEHICLE COMPONENT HEALTH MONITORING

FIELD

The present disclosure relates generally to using artificial intelligence, including machine-learned models, for monitoring an operational health of components of a vehicle, such as electric vehicles.

BACKGROUND

Research on climate change has identified the emissions from internal combustion vehicles as a contributing factor to accelerating warming of the planet. Replacing internal combustion vehicles with electric vehicles can decrease net greenhouse gas emissions. Improving electric vehicles can increase use and adoption of electric vehicles as compared to internal combustion vehicles. Accordingly, improving electric vehicles can help mitigate climate change.

Vehicles, such as automobiles, are complex electromechanical assemblies of components. Some components may experience wear during use. The operational health of some components may degrade over time. Many vehicle operators may be familiar with recognizing wear patterns of traditional (e.g., internal combustion) vehicle components. For instance, engine noises or other indicators may provide advance notice of component wear.

Electric vehicles, in turn, may be unfamiliar to many vehicle operators. As such, concerns about electric vehicle maintenance may inhibit adoption of electric vehicles. Improved maintenance techniques for electric vehicles can increase adoption of electric vehicles, thereby helping to mitigate climate change.

SUMMARY

Aspects and advantages of implementations of the present disclosure will be set forth in part in the following description, or may be learned from the description, or may be learned through practice of the implementations.

In one example aspect, the present disclosure provides an example computing system for monitoring an operational health of a vehicle subsystem. The example computing system may include a control circuit. The control circuit may be configured to obtain operating data describing one or more operational characteristics of a component of a subsystem onboard a vehicle. The control circuit may be configured to generate, using a component longevity model and based on the operating data, a component longevity value for the component. The control circuit may be configured to generate, using a vehicle usage model and based on the component longevity value, a prognosis for the component, wherein the vehicle usage model is configured to evaluate the component longevity value based on a usage pattern associated with the vehicle. The control circuit may be configured to initiate, based on the prognosis, a corrective action to mitigate degradation of the component.

In some implementations of the example computing system, the prognosis may include an effective longevity value for the component.

In some implementations of the example computing system, the control circuit may be configured to obtain an initial effective longevity value.

In some implementations of the example computing system, the control circuit may be configured to generate, using the component longevity model and based on the operating data and the initial effective longevity value, the component longevity value for the component.

In some implementations of the example computing system, the control circuit may be configured to iteratively update a storage location that stores the effective longevity value.

In some implementations of the example computing system, the component longevity model may include a physics-based model.

In some implementations of the example computing system, the component longevity model may include a machine-learned neural network trained to output an association between a set of input operational characteristics and one or more failure modes of the component.

In some implementations of the example computing system, the component may be an active electrical component. In some implementations of the example computing system, the one or more failure modes may include at least one of the following: (i) bond wire liftoff, (ii) dielectric breakdown, (iii) threshold voltage instability, or (iv) bias temperature instability.

In some implementations of the example computing system, the control circuit may be configured to, for each respective component of a plurality of components of the subsystem: obtain respective operating data describing one or more respective operational characteristics of the respective component of the plurality of components; and generate, using a respective component longevity model and based on the respective operating data, a respective component longevity value for the respective component. In some implementations of the example computing system, the control circuit may be configured to generate, using the vehicle usage model and based on the plurality of respective component longevity values, a prognosis for the subsystem.

In some implementations of the example computing system, the vehicle usage model may include a machine-learned neural network trained to generate the effective longevity value based on a latent embedding of the usage pattern.

In some implementations of the example computing system, the control circuit may be configured to obtain the usage pattern from a database of usage patterns, the usage pattern stored in the database in association with a particular user of the vehicle.

In some implementations of the example computing system, the vehicle usage model may include a machine-learned neural network trained to recognize anomalous usage patterns of the vehicle based on the one or more operational characteristics. In some implementations of the example computing system, the control circuit may be configured to recognize, using the vehicle usage model, an anomalous usage pattern outside a domain of the component longevity model. In some implementations of the example computing system, the control circuit may be configured to override, based on recognizing the anomalous usage pattern, the component longevity value with the prognosis.

In some implementations of the example computing system, initiating, based on the prognosis, the corrective action may include initiating a control signal configured to cause the vehicle to render a warning message to an occupant of the vehicle.

In some implementations of the example computing system, initiating, based on the prognosis, the corrective action may include transmitting, to a remote server, a message indicating the prognosis.

In one example aspect, the present disclosure provides an example method for monitoring an operational health of a vehicle subsystem. The example method may be a computer-implemented method. The example method may include obtaining operating data describing one or more operational characteristics of a component of a subsystem onboard a vehicle. The example method may include generating, using a component longevity model and based on the operating data, a component longevity value for the component. The example method may include generating, using a vehicle usage model and based on the component longevity value, a prognosis for the component, wherein the vehicle usage model is configured to evaluate the component longevity value based on a usage pattern associated with the vehicle. The example method may include initiating, based on the prognosis, a corrective action to mitigate degradation of the component.

In some implementations of the example method, the prognosis may include an effective longevity value for the component.

In some implementations of the example method, the example method may include obtaining an initial effective longevity value.

In some implementations of the example method, the example method may include generating, using the component longevity model and based on the operating data and the initial effective longevity value, the component longevity value for the component.

In some implementations of the example method, the example method may include iteratively updating a storage location that stores the effective longevity value.

In some implementations of the example method, the component longevity model may include a physics-based model.

In some implementations of the example method, the component longevity model may include a machine-learned neural network trained to output an association between a set of input operational characteristics and one or more failure modes of the component.

In some implementations of the example method, the component may be an active electrical component. In some implementations of the example method, the one or more failure modes may include at least one of the following: (i) bond wire liftoff, (ii) dielectric breakdown, (iii) threshold voltage instability, or (iv) bias temperature instability.

In some implementations of the example method, the example method may include, for each respective component of a plurality of components of the subsystem: obtaining respective operating data describing one or more respective operational characteristics of the respective component of the plurality of components; and generating, using a respective component longevity model and based on the respective operating data, a respective component longevity value for the respective component. In some implementations of the example method, the example method may include generating, using the vehicle usage model and based on the plurality of respective component longevity values, a prognosis for the subsystem.

In some implementations of the example method, the vehicle usage model may include a machine-learned neural network trained to generate the effective longevity value based on a latent embedding of the usage pattern.

In some implementations of the example method, the example method may include obtaining the usage pattern from a database of usage patterns, the usage pattern stored in the database in association with a particular user of the vehicle.

In some implementations of the example method, the vehicle usage model may include a machine-learned neural network trained to recognize anomalous usage patterns of the vehicle based on the one or more operational characteristics. In some implementations of the example method, the example method may include recognizing, using the vehicle usage model, an anomalous usage pattern outside a domain of the component longevity model. In some implementations of the example method, the example method may include overriding, based on recognizing the anomalous usage pattern, the component longevity value with the prognosis.

In some implementations of the example method, initiating, based on the prognosis, the corrective action may include initiating a control signal configured to cause the vehicle to render a warning message to an occupant of the vehicle.

In some implementations of the example method, initiating, based on the prognosis, the corrective action may include transmitting, to a remote server, a message indicating the prognosis.

In one example aspect, the present disclosure provides one or more example non-transitory computer-readable media that store instructions. The instructions of the one or more example non-transitory computer-readable media may be executable by a control circuit to obtain operating data describing one or more operational characteristics of a component of a subsystem onboard a vehicle. The instructions of the one or more example non-transitory computer-readable media may be executable by the control circuit to generate, using a component longevity model and based on the operating data, a component longevity value for the component. The instructions of the one or more example non-transitory computer-readable media may be executable by the control circuit to generate, using a vehicle usage model and based on the component longevity value, a prognosis for the component, wherein the vehicle usage model is configured to evaluate the component longevity value based on a usage pattern associated with the vehicle. The instructions of the one or more example non-transitory computer-readable media may be executable by the control circuit to initiate, based on the prognosis, a corrective action to mitigate degradation of the component.

In some implementations of the example one or more example non-transitory computer-readable media, the prognosis may include an effective longevity value for the component.

In some implementations of the example one or more example non-transitory computer-readable media, the instructions of the one or more example non-transitory computer-readable media may be executable by the control circuit to obtain an initial effective longevity value.

In some implementations of the example one or more example non-transitory computer-readable media, the instructions of the one or more example non-transitory computer-readable media may be executable by the control circuit to generate, using the component longevity model and based on the operating data and the initial effective longevity value, the component longevity value for the component.

In some implementations of the example one or more example non-transitory computer-readable media, the instructions of the one or more example non-transitory computer-readable media may be executable by the control circuit to iteratively update a storage location that stores the effective longevity value.

In some implementations of the example one or more example non-transitory computer-readable media, the component longevity model may include a physics-based model.

In some implementations of the example one or more example non-transitory computer-readable media, the component longevity model may include a machine-learned neural network trained to output an association between a set of input operational characteristics and one or more failure modes of the component.

In some implementations of the example one or more example non-transitory computer-readable media, the component may be an active electrical component. In some implementations of the example one or more example non-transitory computer-readable media, the one or more failure modes may include at least one of the following: (i) bond wire liftoff, (ii) dielectric breakdown, (iii) threshold voltage instability, or (iv) bias temperature instability.

In some implementations of the example one or more example non-transitory computer-readable media, the instructions of the one or more example non-transitory computer-readable media may be executable by the control circuit to, for each respective component of a plurality of components of the subsystem: obtain respective operating data describing one or more respective operational characteristics of the respective component of the plurality of components; and generate, using a respective component longevity model and based on the respective operating data, a respective component longevity value for the respective component. In some implementations of the example one or more example non-transitory computer-readable media, the instructions of the one or more example non-transitory computer-readable media may be executable by the control circuit to generate, using the vehicle usage model and based on the plurality of respective component longevity values, a prognosis for the subsystem.

In some implementations of the example one or more example non-transitory computer-readable media, the vehicle usage model may include a machine-learned neural network trained to generate the effective longevity value based on a latent embedding of the usage pattern.

In some implementations of the example one or more example non-transitory computer-readable media, the instructions of the one or more example non-transitory computer-readable media may be executable by the control circuit to obtain the usage pattern from a database of usage patterns, the usage pattern stored in the database in association with a particular user of the vehicle.

In some implementations of the example one or more example non-transitory computer-readable media, the vehicle usage model may include a machine-learned neural network trained to recognize anomalous usage patterns of the vehicle based on the one or more operational characteristics. In some implementations of the example one or more example non-transitory computer-readable media, the instructions of the one or more example non-transitory computer-readable media may be executable by the control circuit to recognize, using the vehicle usage model, an anomalous usage pattern outside a domain of the component longevity model. In some implementations of the example one or more example non-transitory computer-readable media, the instructions of the one or more example non-transitory computer-readable media may be executable by the control circuit to override, based on recognizing the anomalous usage pattern, the component longevity value with the prognosis.

In some implementations of the example one or more example non-transitory computer-readable media, initiating, based on the prognosis, the corrective action may include initiating a control signal configured to cause the vehicle to render a warning message to an occupant of the vehicle.

In some implementations of the example one or more example non-transitory computer-readable media, initiating, based on the prognosis, the corrective action may include transmitting, to a remote server, a message indicating the prognosis.

Other example aspects of the present disclosure are directed to other systems, methods, vehicles, apparatuses, tangible non-transitory computer-readable media, and devices for improving the operation of, and computational efficiency associated with, a vehicle.

These and other features, aspects, and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which.

DETAILED DESCRIPTION

Figure 1:
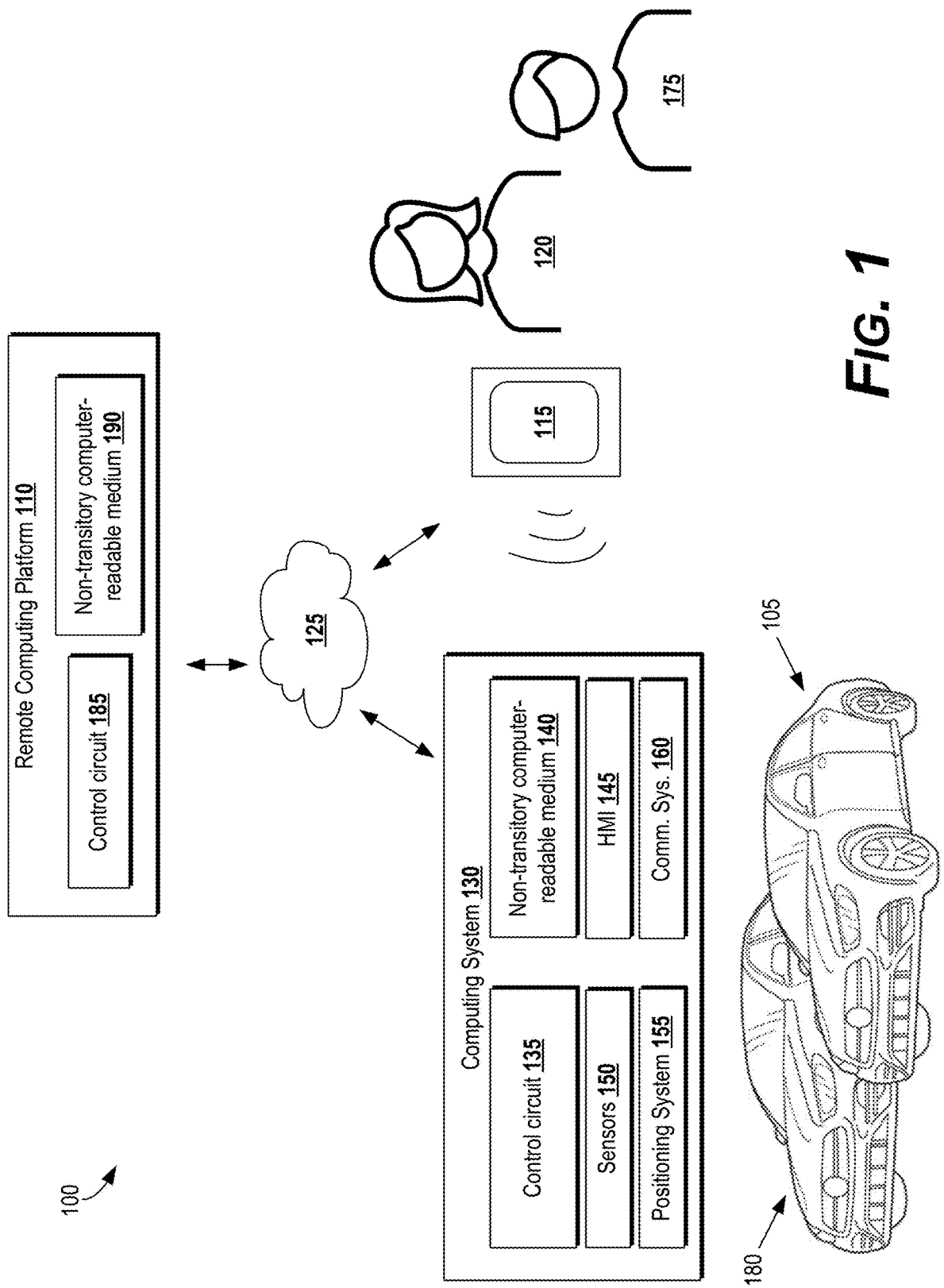
FIG. 1 illustrates an example computing ecosystem according to example implementations of the present disclosure.

An aspect of the present disclosure relates to machine-learned vehicle component health monitoring. Operational health of vehicle components may be a useful metric for evaluating a current condition of a vehicle, planning future maintenance needs, or diagnosing past component failures. Advantageously, example implementations of the present disclosure may analyze real-time operating characteristics of a vehicle using a machine-learned data processing pipeline to estimate current operational health states for determining when maintenance may be needed. For example, an implementation of the present disclosure may analyze longevity of the vehicle during a driving state or control state when a control unit is active and currents/voltage are present in the system. The machine-learned data processing pipeline may leverage vehicle usage data to customize the predicted maintenance intervals based on historical usage patterns. The machine-learned data processing pipeline may leverage physics-based component models that provide initial estimates that can be refined using machine-learned models.

For example, a vehicle may include an electrical device or subsystem, such as an inverter. The inverter may contain numerous components. Logged operating data may characterize the components. Operating data may characterize the components locally (e.g., logging measurements of the component itself, the circuit in which the component is located, etc.), globally (e.g., logging measurements of the vehicle as a whole, or sub-assemblies of the vehicle, or larger subsystems containing the inverter, etc.), or at any other scale. For instance, operating data can include voltage measurements across a component, current measurements within a component, accelerations experienced by the component, cycle counts of operations performed by the component, or other operational characteristics.

To estimate a health status of the inverter, an example machine-learned data processing pipeline may process the operating data to evaluate each of the component(s). A component longevity model may process the operating data and output longevity value(s) for the component. A component longevity model may be configured to estimate a health status of a particular component or type of component (e.g., such as a remaining useful life). A component longevity model may be or include a machine-learned model, physics-based analytical model, or combination thereof. Different component longevity models may correspond to different component types. For instance, a capacitor component longevity model may process operating data monitoring a capacitor to evaluate a health status of the capacitor, such as a remaining useful life of the capacitor. A semiconductor component longevity model may process operating data monitoring a semiconductor to evaluate the health status of the semiconductor, such as a remaining useful life of the semiconductor. In this manner, for instance, the component longevity models may evaluate the health of components of the inverter.

The data processing pipeline may refine the output(s) of the component longevity models to obtain a more accurate estimate of the inverter health. The data processing pipeline may process the output(s) of the component longevity model(s) using a vehicle usage model to estimate the effective longevity if the vehicle is used according to expected usage patterns. For instance, a vehicle usage model may process vehicle usage data (e.g., associated with the vehicle, associated with a user account for the vehicle, etc.) that indicates driving styles, times, durations, trip types, etc. to obtain a prognosis for a degradation trajectory for the inverter. For instance, a particular driver may accelerate and brake abruptly or routinely carry heavy loads. Various demands on the vehicle may shorten a useful life of a component due to additional electrical or mechanical loads on the inverter. Further, a given remaining life estimate for a component may be realized differently in terms of practical use cases. For instance, the inverter (or components thereof) may endure N trips for a first, light-duty user or 0.5N trips for a second, heavy-duty user. The vehicle usage model may thus refine the component longevity values as applied in different usage scenarios to obtain an applied longevity prognosis for the inverter.

Based on the prognosis, the data processing pipeline may initiate a corrective action to mitigate degradation of the inverter. A corrective action may include adjusting a drive mode or other drive parameters to ease loads placed on the inverter (e.g., electrical loads, mechanical loads, etc.). A corrective action may include triggering a notification or alert regarding the health status of the component(s). In this manner, for instance, wear may be mitigated by facilitating reduced demands and timely maintenance.

The technology of the present disclosure provides a number of technical effects and improvements to vehicle and computing technology. For instance, a computing system may leverage machine-learned data processing pipelines to increase overall vehicle system uptime, reduce vehicle system downtime, detect and mitigate natural component wear and degradation, and the like. A system such as a computing system may leverage machine-learned data processing pipelines to detect symptoms leading to component failure or damage and mitigate such degradation before it occurs. In this manner, for instance, example implementations may improve vehicle performance and reliability.

In some implementations, a computing system may use both physics-based analytical models and machine-learned empirical models, obtaining the advantages of each. In this manner, for instance, vehicle computing systems may provide improved monitoring functionality. As vehicles become increasingly complex machines with advanced electromechanical systems, improved vehicle computing systems according to example implementations of the present disclosure may facilitate further advances in the long-term care of such vehicles. In this manner, for instance, example implementations may increase vehicle longevity, avoiding the use of natural resources expended in premature replacement of vehicles. In this manner, for instance, example implementations may advance the field of vehicles and vehicle computing systems as a whole.

For instance, example implementations of the present disclosure may help avoid unnecessary repairs by more intelligently predicting a remaining useful life of a component. By avoiding unnecessary repairs, fewer components may be used, thereby decreasing a carbon footprint associated with use of the vehicle. For instance, example implementations of the present disclosure may help avoid catastrophic component failures by more intelligently monitoring the health of other components and prompting a user to address a maintenance need before such catastrophic failure occurs. By avoiding catastrophic component failures, fewer components may be used, and fewer vehicles may be totaled, destroyed, or otherwise pulled from active service, thereby increasing the useful life of the vehicle as a whole. This in turn can amortize the carbon footprint of the vehicle over a longer period of time, effectively decreasing the emissions per mile/hour of the vehicle.

Further, example implementations may facilitate increased efficiency in servicing vehicles. Machine-learned data processing pipelines according to the present disclosure may generate advance notice of component wear and degradation. This notice may be transmitted to a remote computing system associated with a repair network (e.g., a dealership network). The remote computing system may use this notice to pre-order the necessary components for repairing or otherwise addressing the component degradation. Accordingly, a remote computing system may have sufficient notice to time the service visit for servicing the vehicle to optimize use of service center resources. As such, service center resources (e.g., floor space, equipment, shop consumables, utilities, etc.) may be more efficiently deployed, reducing waste. In this manner, for instance, example implementations may advance the field of vehicle repair and maintenance.

Reference now will be made in detail to embodiments, one or more examples of which are illustrated in the drawings. Example features are described to illustrate various possible embodiments and do not limit the present disclosure. In fact, it will be apparent to those skilled in the art that various modifications and variations may be made to the embodiments without departing from the scope or spirit of the present disclosure. For instance, features illustrated or described as part of one embodiment may be used with another embodiment to yield a still further embodiment. Thus, it is intended that aspects of the present disclosure cover such modifications and variations.

The technology of the present disclosure may include the collection of data associated with a user in the event that the user expressly authorizes such collection. Such authorization may be provided by the user via explicit user input to a user interface in response to a prompt that expressly requests such authorization. Collected data may be anonymized, pseudonymized, encrypted, noised, securely stored, or otherwise protected. A user may opt out of such data collection at any time.

FIG. 1 illustrates an example computing ecosystem 100 according to an embodiment hereof. The ecosystem 100 may include a vehicle 105, a remote computing platform 110 (also referred to herein as computing platform 110), and a user device 115 associated with a user 120. The user 120 may be a driver of the vehicle. In some implementations, the user 120 may be a passenger of the vehicle. The vehicle 105, the computing platform 110, and the user device 115 may be configured to communicate with one another via one or more networks 125.

The systems/devices of ecosystem 100 may communicate using one or more application programming interfaces (APIs). This may include external facing APIs to communicate data from one system/device to another. The external facing APIs may allow the systems/devices to establish secure communication channels via secure access channels over the networks 125 through any number of methods, such as web-based forms, programmatic access via RESTful APIs, Simple Object Access Protocol (SOAP), remote procedure call (RPC), scripting access, etc.

The computing platform 110 may include a computing system that is remote from the vehicle 105. In an embodiment, the computing platform 110 may include a cloud-based server system. The computing platform 110 may include one or more back-end services for supporting the vehicle 105. The services may include, for example, tele-assist services, navigation/routing services, performance monitoring services, etc. The computing platform 110 may host or otherwise include one or more APIs for communicating data to/from a computing system 130 of the vehicle 105 or the user device 115.

The computing platform 110 may include one or more computing devices. For instance, the computing platform 110 may include a control circuit 185 and a non-transitory computer-readable medium 190 (e.g., memory). The control circuit 185 of the computing platform 110 may be configured to perform the various operations and functions described herein. In an embodiment, the control circuit 185 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit.

In an embodiment, the control circuit 185 may be programmed by one or more computer-readable or computer-executable instructions stored on the non-transitory computer-readable medium 190. In an embodiment, the non-transitory computer-readable medium 190 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 190 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick. In some cases, the non-transitory computer-readable medium 190 may store computer-executable instructions or computer-readable instructions, such as instructions to perform the operations and methods described herein.

In various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 185 to perform one or more functional tasks. The modules and computer-readable/executable instructions may be described as performing various operations or tasks when a control circuit or other hardware component is executing the modules or computer-readable instructions.

The user device 115 may include a computing device owned or otherwise accessible to the user 120. For instance, the user device 115 may include a phone, laptop, tablet, wearable device (e.g., smart watch, smart glasses, headphones), personal digital assistant, gaming system, personal desktop devices, other hand-held devices, or other types of mobile or non-mobile user devices. As further described herein, the user device 115 may include one or more input components such as buttons, a touch screen, a joystick or other cursor control, a stylus, a microphone, a camera or other imaging device, a motion sensor, etc. The user device 115 may include one or more output components such as a display device (e.g., display screen), a speaker, etc. In an embodiment, the user device 115 may include a component such as, for example, a touchscreen, configured to perform input and output functionality to receive user input and present information for the user 120. The user device 115 may execute one or more instructions to run an instance of a software application and present user interfaces associated therewith. The launch of a software application for a respective transportation platform may initiate a user-network session with the computing platform 110.

The networks 125 may be any type of network or combination of networks that allows for communication between devices. In some implementations, the networks 125 may include one or more of a local area network, wide area network, the Internet, secure network, cellular network, mesh network, peer-to-peer communication link or some combination thereof and may include any number of wired or wireless links. Communication over the networks 125 may be accomplished, for instance, via a network interface using any type of protocol, protection scheme, encoding, format, packaging, etc. Communication between the computing system 130 and the user device 115 may be facilitated by near field or short range communication techniques (e.g., Bluetooth low energy protocol, radio frequency signaling, NFC protocol).

The vehicle 105 may be a vehicle that is operable by the user 120. In an embodiment, the vehicle 105 may be an automobile or another type of ground-based vehicle that is manually driven by the user 120. For example, the vehicle 105 may be a Mercedes-Benz® car or van. In some implementations, the vehicle 105 may be an aerial vehicle (e.g., a personal airplane) or a water-based vehicle (e.g., a boat). The vehicle 105 may include operator-assistance functionality such as cruise control, advanced driver assistance systems, etc. In some implementations, the vehicle 105 may be a fully or semi-autonomous vehicle.

The vehicle 105 may include a powertrain and one or more power sources. The powertrain may include a motor (e.g., an internal combustion engine, electric motor, or hybrid thereof), e-motor (e.g., electric motor), transmission (e.g., automatic, manual, continuously variable), driveshaft, axles, differential, e-components, gear, etc. The power sources may include one or more types of power sources. For example, the vehicle 105 may be a fully electric vehicle (EV) that is capable of operating a powertrain of the vehicle 105 (e.g., for propulsion) and the vehicle's onboard functions using electric batteries. In an embodiment, the vehicle 105 may use combustible fuel. In an embodiment, the vehicle 105 may include hybrid power sources such as, for example, a combination of combustible fuel and electricity.

The vehicle 105 may include a vehicle interior. The vehicle interior may include the area inside of the body of the vehicle 105 including, for example, a cabin for users of the vehicle 105. The interior of the vehicle 105 may include seats for the users, a steering mechanism, accelerator interface, braking interface, etc. The interior of the vehicle 105 may include a display device such as a display screen associated with an infotainment system. Such a component may be referred to as a display device of the infotainment system or be considered as a device for implementing an embodiment that includes the use of an infotainment system. For illustrative and example purposes, such a component may be referred to herein as a head unit display device (e.g., positioned in a front/dashboard area of the vehicle interior), a rear unit display device (e.g., positioned in the back passenger area of the vehicle interior), an infotainment head unit or rear unit, or the like.

The display device may display a variety of content to the user 120 including information about the vehicle 105, prompts for user input, etc. The display device may include a touchscreen through which the user 120 may provide user input to a user interface. The display device may be associated with an audio input device (e.g., microphone) for receiving audio input from the user 120. In some implementations, the display device may function as a dashboard of the vehicle 105.

The interior of the vehicle 105 may include one or more lighting elements. The lighting elements may be configured to emit light at various colors, brightness levels, etc.

The vehicle 105 may include a vehicle exterior. The vehicle exterior may include the outer surface of the vehicle 105. The vehicle exterior may include one or more lighting elements (e.g., headlights, brake lights, accent lights). The vehicle 105 may include one or more doors for accessing the vehicle interior by, for example, manipulating a door handle of the vehicle exterior. The vehicle 105 may include one or more windows, including a windshield, door windows, passenger windows, rear windows, sunroof, etc.

Certain routine and conventional components of vehicle 105 (e.g., an engine) are not illustrated and/or discussed herein for the purpose of brevity. One of ordinary skill in the art will understand the operation of conventional vehicle components in vehicle 105.

The vehicle 105 may include a computing system 130 that is onboard the vehicle 105. The computing system 130 may be located onboard the vehicle 105 in that it is included on or within the vehicle 105. The computing system 130 may include one or more computing devices, which may include various computing hardware components. For instance, the computing system 130 may include a control circuit 135 and a non-transitory computer-readable medium 140 (e.g., memory). The control circuit 135 may be configured to perform the various operations and functions for implementing the technology described herein.

In an embodiment, the control circuit 135 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 135 and/or computing system 130 may be part of, or may form, a vehicle control unit (also referred to as a vehicle controller) that is embedded or otherwise disposed in the vehicle 105 (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior and interior controller (CEIC), a zone controller, or any other controller (the term "or" and "and/or" may be used interchangeably herein).

In an embodiment, the control circuit 135 may be programmed by one or more computer-readable or computer-executable instructions stored on the non-transitory computer-readable medium 140. In an embodiment, the non-transitory computer-readable medium 140 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 140 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick. In some cases, the non-transitory computer-readable medium 140 may store computer-executable instructions or computer-readable instructions, such as instructions to perform the methods of FIGS. 10A-B and 11. Additionally, or alternatively, similar such instructions may be stored in the computing platform 110 (e.g., the non-transitory computer-readable medium 190) and provided over the networks 125.

The computing system 130 (e.g., the control circuit 135) may be configured to communicate with the other components of the vehicle 105 via a communication channel. The communication channel may include one or more data buses (e.g., controller area network (CAN)), on-board diagnostics connector (e.g., OBD-II), or a combination of wired or wireless communication links. The onboard systems may send or receive data, messages, signals, etc. amongst one another via the communication channel.

In an embodiment, the communication channel may include a direct connection, such as a connection provided via a dedicated wired communication interface, such as a RS-232 interface, a universal serial bus (USB) interface, or via a local computer bus, such as a peripheral component interconnect (PCI) bus. In an embodiment, the communication channel may be provided via a network. The network may be any type or form of network, such as a personal area network (PAN), a local-area network (LAN), Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the systems/devices of the vehicle 105 may communicate via an intermediate storage device, or more generally an intermediate non-transitory computer-readable medium. For example, the non-transitory computer-readable medium 140, which may be external to the computing system 130, may act as an external buffer or repository for storing information. In such an example, the computing system 130 may retrieve or otherwise receive the information from the non-transitory computer-readable medium 140.

The vehicle 105 may include one or more human-machine interfaces (HMIs) 145. The human-machine interfaces 145 may include a display device, as described herein. The display device (e.g., touchscreen) may be viewable by a user of the vehicle 105 (e.g., user 120, second user 175) that is located in the front of the vehicle 105 (e.g., driver's seat, front passenger seat). Additionally, or alternatively, a display device (e.g., rear unit) may be viewable by a user that is located in the rear of the vehicle 105 (e.g., back passenger seats).

The vehicle 105 may include one or more sensors 150. Example sensors 150 may include, for instance, oxygen sensors, air flow sensors, air pressure sensors, air temperature sensors, coolant temperature sensors, oil temperature sensors, oil pressure sensors, crankshaft position sensors, camshaft position sensors, knock sensors, transmission temperature sensors, motor torque sensors, motor speed sensors, throttle position sensors, brake pedal sensors, brake pressure sensors, wheel speed sensors, steering angle sensors, steering torque sensors, rain sensors, light sensors, tire pressure sensors, exhaust temperature sensors, suspension position sensors, airbag sensors, seat belt sensors, occupancy sensors, inertial measurement units, battery charge sensors, battery temperature sensors, and other temperature sensors (e.g., junction temperatures), voltage probes (e.g., input/output voltages), current probes (e.g., input/output currents), strain gauges, optical sensors, etc. Any type of data source may be used. Electrical components may report input voltage (AC or DC), input current (AC or DC), output voltage (AC or DC), output current (AC or DC), etc.

The sensors 150 may be configured to acquire sensor data. This may include sensor data associated with the surrounding environment of the vehicle 105, sensor data associated with the interior of the vehicle 105, or sensor data associated with a particular vehicle function. The sensor data may be indicated of conditions observed in the interior of the vehicle, exterior of the vehicle, or in the surrounding environment. For instance, the sensor data may acquire image data, inside/outside temperature data, weather data, data indicative of a position of a user/object within the vehicle 105, weight data, motion/gesture data, audio data, or other types of data. The sensors 150 may include one or more: cameras (e.g., visible spectrum cameras, infrared cameras), motion sensors, audio sensors (e.g., microphones), weight sensors (e.g., for a vehicle a seat), temperature sensors, humidity sensors, Light Detection and Ranging (LIDAR) systems, Radio Detection and Ranging (RADAR) systems, or other types of sensors. The vehicle 105 may also include other sensors configured to acquire data associated with the vehicle 105. For example, the vehicle 105 may include inertial measurement units, wheel odometry devices, or other sensors.

The vehicle 105 may include a positioning system 155. The positioning system 155 may be configured to generate position data (also referred to as location data) indicative of a position (also referred to as a location) of the vehicle 105. For example, the positioning system 155 may determine position by using one or more of inertial sensors (e.g., inertial measurement units, etc.), a satellite positioning system, based on IP address, by using triangulation and/or proximity to network access points or other network components (e.g., cellular towers, WiFi access points, etc.), or other suitable techniques. The positioning system 155 may determine a current location of the vehicle 105. The location may be expressed as a set of coordinates (e.g., latitude, longitude), an address, a semantic location (e.g., "at work"), etc.

In an embodiment, the positioning system 155 may be configured to localize the vehicle 105 within its environment. For example, the vehicle 105 may access map data that provides detailed information about the surrounding environment of the vehicle 105. The map data may provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, or instructions of signage (e.g., stop signs, yield signs), traffic lights (e.g., stop lights), or other traffic signals or control devices/markings (e.g., cross walks)); or any other data. The positioning system 155 may localize the vehicle 105 within the environment (e.g., across multiple axes) based on the map data. For example, the positioning system 155 may process sensor data (e.g., LIDAR data, camera data, etc.) to match it to a map of the surrounding environment to get an understanding of the vehicle's position within that environment. The determined position of the vehicle 105 may be used by various systems of the computing system 130 or provided to the computing platform 110.

The vehicle 105 may include a communications system 160 configured to allow the vehicle 105 (and its computing system 130) to communicate with other computing devices. The computing system 130 may use the communications system 160 to communicate with the computing platform 110 or one or more other remote computing devices over a network 125 (e.g., via one or more wireless signal connections). In some implementations, the communications system 160 may allow communication among one or more of the systems on-board the vehicle 105.

In an embodiment, the communications system 160 may be configured to allow the vehicle 105 to communicate with or otherwise receive data from the user device 115. The communications system 160 may utilize various communication technologies such as, for example, Bluetooth low energy protocol, radio frequency signaling, or other short range or near filed communication technologies. The communications system 160 may include any suitable components for interfacing with one or more networks, including, for example, transmitters, receivers, ports, controllers, antennas, or other suitable components that may help facilitate communication.

Figure 2:
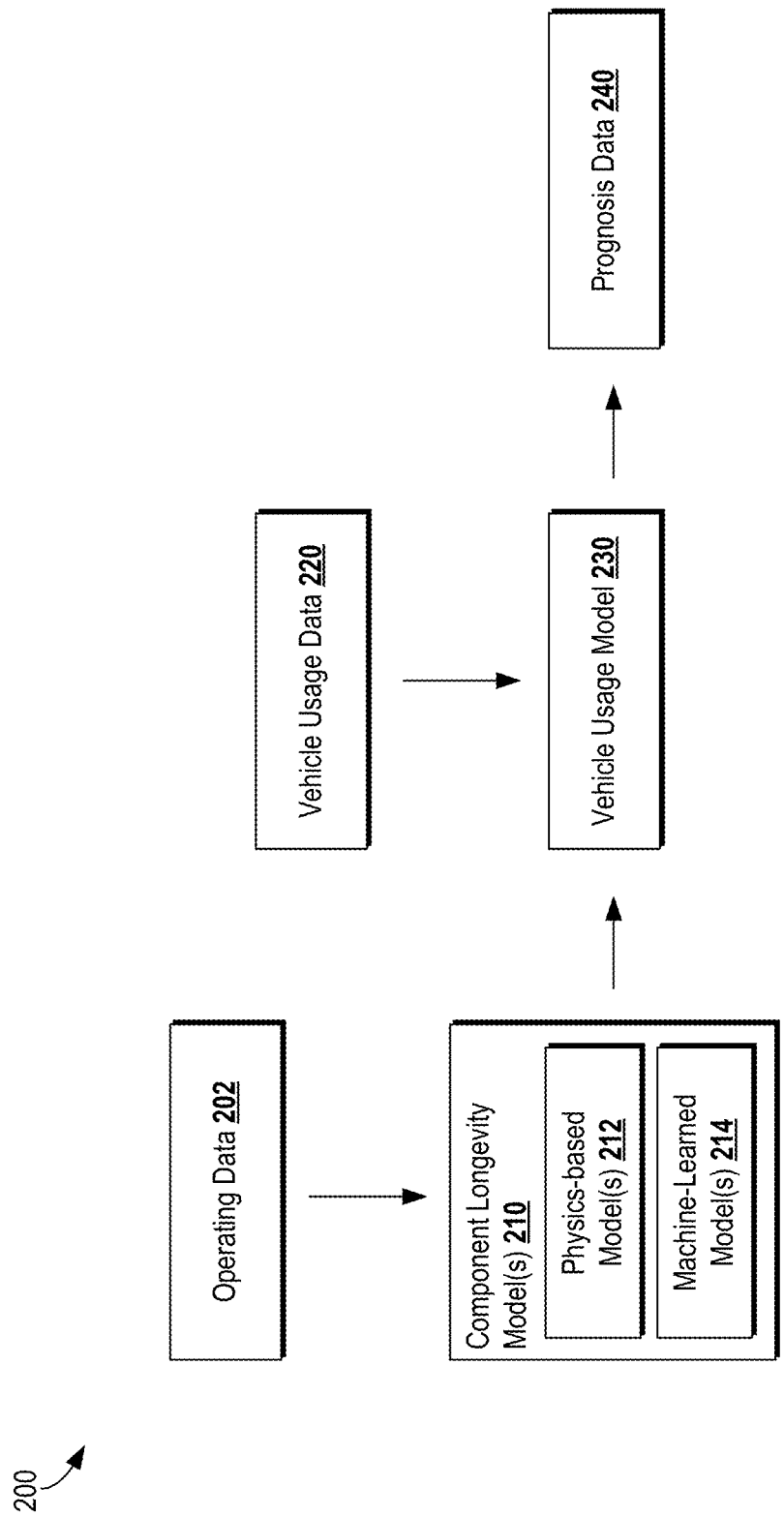
FIG. 2 illustrates a diagram of an example data processing pipeline according to example implementations of the present disclosure.

FIG. 2 illustrates an example data processing pipeline 200 for vehicle component health monitoring according to example implementations of the present disclosure. Data processing pipeline 200 may process operating data 202 using component longevity model(s) 210 (e.g., optionally including physics-based model(s) 212, machine-learned model(s) 214, or both). The output(s) of the component longevity model(s) 210 may provide an initial estimate of a longevity value for one or more components. Data processing pipeline 200 may input vehicle usage data 220 to vehicle usage model(s) 230 to refine the output(s) of component longevity model(s) 210. Vehicle usage model(s) 230 can generate prognosis data 240 to describe an effective longevity of the component(s) in the applied context of the expected vehicle usage.

Operating data 202 may include substantially any measured, inferred, or generated quantity, quality, or other value descriptive of an operation of a system containing a monitored component or descriptive of an environment thereof. For instance, operating data 202 may describe operational characteristics external to a vehicle (e.g., weather conditions, etc.). Operating data 202 may describe operational characteristics of the vehicle itself.

Operating data 202 may describe global operating characteristics for the vehicle. A global operating characteristic may be an operating characteristic shared across the entire vehicle. For instance, global operating characteristics may include user account data associated with a user driving the vehicle. Global operating characteristics may include a velocity or acceleration or other movement measurements associated with a reference point of the vehicle (e.g., a rigid portion of a chassis). Global operating characteristics may include vehicle power states (e.g., on, off, accessory, charging, etc.). Global operating characteristics may include a passenger count, load weight, fuel/charge status, mileage count, etc.

Operating data 202 may describe local operating characteristics for various systems, subsystems, or components. Local operating characteristics may include absolute measurements or relative measurements. For instance, local operating characteristics may include absolute or relative movement measurements (e.g., defined relative to a reference point of the vehicle). Local operating characteristics may include local temperatures measured near a component of interest. Local operating characteristics may include electrical parameters measured for a component of interest, such as a voltage across or current through a component, or a spectral analysis of an electrical signal. Local operating characteristics may include cycle counts or uptime measurements for individual systems, subsystems, or components.

Computing system 130 may collect operating data 202 from the monitored components directly. Computing system 130 may log signals received from various systems, subsystems, and components of the vehicle. Computing system 130 may log signals received from sensors or probes deployed across the vehicle. The sensors or probes may be dedicated to monitoring system health or may be otherwise used in the normal operation of the vehicle.

Operating data 202 may include raw data or pre-processed data. Operating data 202 may include filtered data processed for removing spurious or noisy signals. Operating data 202 may include data output by a preprocessing stage of data processing pipeline 200 (not pictured). The preprocessing stage may implement digital or analog filters. The preprocessing stage may implement one or more machine-learned models trained to extract pertinent parameters of interest from a set of underlying raw data.

Operating data 202 may include subsampled data. Operating data 202 may be subsampled from a larger set of log data. A sampling resolution of operating data 202 may be configured to optimize processing latency for real-time implementation of data processing pipeline 200.

Example data sources for operating data 202 may include, for instance, oxygen sensors, air flow sensors, air pressure sensors, air temperature sensors, coolant temperature sensors, oil temperature sensors, oil pressure sensors, crankshaft position sensors, camshaft position sensors, knock sensors, transmission temperature sensors, motor torque sensors, motor speed sensors, throttle position sensors, brake pedal sensors, brake pressure sensors, wheel speed sensors, steering angle sensors, steering torque sensors, rain sensors, light sensors, tire pressure sensors, exhaust temperature sensors, suspension position sensors, airbag sensors, seat belt sensors, occupancy sensors, inertial measurement units, battery charge sensors, battery temperature sensors, and other temperature sensors (e.g., junction temperatures), voltage probes (e.g., input/output voltages), current probes (e.g., input/output currents), strain gauges, optical sensors, etc. Any type of data source may be used. Electrical components may report input voltage (AC or DC), input current (AC or DC), output voltage (AC or DC), output current (AC or DC), etc.

Component longevity model(s) 210 may process operating data 202 to generate an initial longevity value for one or more components. Component longevity model(s) 210 may process operating data 202 in real-time in a streaming manner, in batches at predetermined intervals, or on demand. Component longevity model(s) 210 may execute onboard a vehicle (e.g., vehicle 105, 180) or remotely.

Physics-based model(s) 212 may be or include analytical or empirical models for modeling component behavior. For instance, physics-based models 212 may include failure models based on the Arrhenius model. Physics-based models 212 may include closed-form, analytical thermodynamic models of heat transfer through components. For instance, physics-based models 212 may include heat transfer models for determining a local temperature (e.g., a junction temperature of a transistor) based on a temperature at a temperature sensor located away from the junction itself (e.g., on a heatsink, etc.). Physics-based models 212 may include analytical thermomechanical stress models to calculate stress, strain, and fatigue of components or their fixtures.

Example physics-based models 212 may include, for instance, semiconductor models for estimating bond-wire lift-off, time-dependent dielectric breakdown, threshold voltage instability, bias temperature instability, and the like. Example physics-based models 212 may include, for instance, capacitor models for estimating capacitance drift, parasitic component drift, temperature drive, leakage current, electrolytic degradation, and the like.

Figure 3B:
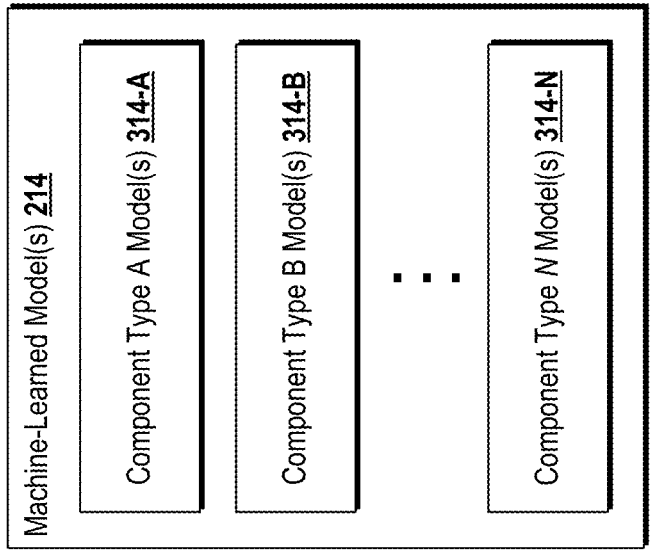
FIG. 3B illustrates a diagram of an example model configuration according to example implementations of the present disclosure.
Figure 3A:
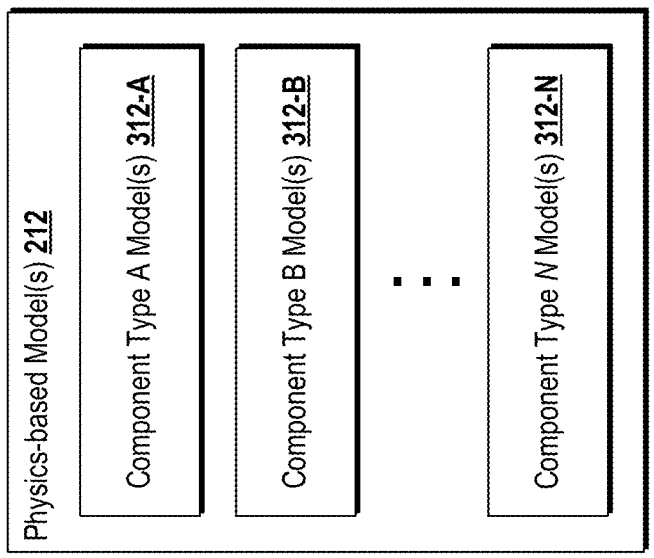
FIG. 3A illustrates a diagram of an example model configuration according to example implementations of the present disclosure.

FIG. 3A illustrates an example configuration of physics-based model(s) 212. Physics-based model(s) 212 may include a plurality of models. The plurality of models may be associated with a respective plurality of components or component types. For instance, physics-based models 212 may include component type A models 312-A, component type B models 312-B, and so on up to component type N models 312-N for N different component types. The plurality of models can be the same or different types of models. Multiple of the plurality of models may be a same model type (e.g., based on the Arrhenius model) albeit with optionally different parameters. The plurality of models may process the same input data or different input data. Respective models of the plurality of models may process local operational characteristics associated with respective components under analysis, optionally in view of other global operational characteristics.

With reference again to FIG. 2, data processing pipeline 200 may use physics-based models 212 to obtain a variety of outputs. An example output may include a component longevity value. A component longevity value may be any value, flag, or other indicator of a health status of a component. A component longevity value may include or otherwise indicate a remaining useful life estimate. Remaining useful life can refer to an estimated amount of time that a system or component may continue to operate before it reaches the end of its useful life. Remaining useful life may be a prediction of the remaining operational time of a system or component based on its current condition and historical performance. The remaining useful life may be output in terms of time (e.g., hours) or usage (e.g., cycle count, such as vehicle power cycles, miles, trip counts, etc.).

Machine-learned model(s) 214 may be or include any variety of machine-learned models trained to process input data to evaluate component health. Machine-learned model(s) 214 may be or include models trained using supervised or unsupervised techniques. Machine-learned model(s) 214 may be or include sequence-based models (e.g., transformer networks, long short-term memory networks, recurrent neural networks, etc.) for processing sequences of operating data 202. Machine-learned model(s) 214 may be or include convolutional neural networks for generating feature maps of operating data 202 (e.g., feature maps of rasterized waveforms, etc.). Machine-learned model(s) 214 may operate in conjunction with or in lieu of physics-based model(s) 212. Machine-learned model(s) 214 may infer component health status from operating data 202. Machine-learned model(s) 214 may regress an estimated longevity value or may generate a classification output indicating a healthy status, a warning status, or a not healthy status. Further machine-learned model detail and training procedures are described below with respect to FIG. 8.

FIG. 3B illustrates an example configuration of machine-learned model(s) 214. Machine-learned model(s) 214 may include a plurality of models. The plurality of models may be associated with a respective plurality of components or component types. For instance, machine-learned model(s) 214 may include component type A models 314-A, component type B models 314-B, and so on up to component type N models 314-N for N different component types. The plurality of models can be the same or different types of models. Multiple of the plurality of models may be a same model type (e.g., token sequence-based, image-based, etc.) albeit with optionally independently trained parameters. The plurality of models may process the same input data or different input data. Respective models of the plurality of models may process local operational characteristics associated with respective components under analysis, optionally in view of other global operational characteristics.

With reference again to FIG. 2, vehicle usage data 220 may describe historical patterns of use of the vehicle. Historical patterns may be extracted from logged operating data (e.g., previously collected operating data 202). Vehicle usage data 220 may contain any or all of the same data as operating data 202. Vehicle usage data 220 may contain operating data 202 charted over time. Vehicle usage data 220 may contain a score or other evaluation metric output by a scoring model configured to evaluate operating data 202. Vehicle usage data 220 may be associated with a user account. For instance, vehicle usage data 220 may include data describing usage patterns associated with a particular user of the vehicle.

The user may be a driver/operator or passenger. Vehicle usage data 220 may include data describing use of the vehicle as a whole or use of any component or subsystem thereof. For instance, vehicle usage data 220 may include data describing how a user A (e.g., user 120) has driven the vehicle in the past (e.g., gently, spiritedly, such as may be indicated by acceleration and braking), when and how often user A tends to drive the vehicle, etc. Vehicle usage data 220 may include data describing how a user B (e.g., user 175) has driven the vehicle in the past (e.g., gently, spiritedly, such as may be indicated by acceleration and braking), when and how often user B tends to drive the vehicle, etc. Vehicle usage data 220 may include data describing how a passenger user A (e.g., user 120) has adjusted a passenger seat in the past. Vehicle usage data 220 may include data describing how a passenger user B (e.g., user 175) has adjusted a passenger seat in the past.

Vehicle usage data 220 may be embedded into a latent space. Operating data 202 may be processed using a machine-learned embedding model to generate a multidimensional embedding characterizing usage associated with a particular user account. Such embedding may be stored in association with the user account (e.g., stored on the vehicle, at the remote computing system, etc.). Vehicle usage data 220 may be encrypted to preserve user account data security.

Data processing pipeline 200 may obtain vehicle usage data 220 from data storage onboard a vehicle. Data processing pipeline 200 may obtain vehicle usage data 220 from data storage of a remote computing system. For instance, the first time a user uses a vehicle, the vehicle may check a registry on a remote computing system to obtain any pre-existing vehicle usage data associated with the account. The vehicle may cache any obtained vehicle usage data locally for processing by the data processing pipeline 200. The vehicle may periodically update the registry as the vehicle records or generates vehicle usage data 220.

Vehicle usage model 230 may refine output(s) of component longevity model(s) 210 in view of vehicle usage data 220. For instance, component longevity model(s) 210 may provide an estimate of component longevity based on physical models and learned trends associated with entire classes or types of components. Vehicle usage model 230 may refine such estimates to adapt and customize such estimates based on the particular usage experienced by the components. For instance, component longevity model(s) 210 may output a remaining useful lifetime measure in a given unit (e.g., hours, cycles, etc.). But a given number of hours or cycles may translate into meaningful constraints differently for different use cases. For instance, an example component may be projected by component longevity model(s) 210 to have 100 cycles remaining before likely failure. For a usage pattern of only 1 cycle per day (e.g., light use), the prognosis may be less urgent than for a usage pattern of 50 cycles per day (e.g., heavy use). Initiating a replacement for the user in the light use case may result in unnecessary or premature component replacement, incurring unnecessary cost and potentially wasting resources. In contrast, the user in the heavy use case may push the component to failure if not replaced in the next two days, and thus initiating a replacement in a timely manner may be appropriate. In this manner, for instance, vehicle usage model 230 may evaluate the longevity values for component(s) and determine a personalized prognosis.

Vehicle usage model 230 may receive multiple outputs from component longevity model(s) 210. For instance, vehicle usage model 230 may receive multiple outputs from component longevity model(s) 210 respectively associated with the multiple component(s) of a subsystem. Vehicle usage model 230 may refine the outputs of component longevity model(s) 210 by computing an overall longevity value for the subsystem based on the respective component longevity values. For instance, for essential components, a minimum component longevity value (e.g., a minimum remaining useful life) may be selected as the overall longevity value for the subsystem containing the corresponding essential component. For non-essential components, the overall longevity value may be computed based on a weighted combination of longevity values. For instance, the component longevity values may be or include a probability of degradation or failure. The respective components may be associated with a relative cost or other metric associated with failure. An overall longevity value may be computed based on weighting the cost or other failure metric based on the probability of failure.

Vehicle usage model 230 may determine an effective component longevity value. An effective component longevity value may include a component longevity value that has been uprated, downrated, or otherwise altered based on vehicle usage data 220.

Vehicle usage model 230 may be or include one or more machine-learned models. Vehicle usage model 230 may include a decoder architecture configured to receive a latent embedding of vehicle usage data 220 to output the personalized prognosis. Vehicle usage model 230 may be or include a statistical model, heuristic-based model, or other decision-making algorithm.

Vehicle usage model 230 may be or include one or more machine-learned models trained to recognize anomalous usage patterns. For instance, vehicle usage model 230 may be configured to recognize usage patterns outside a valid input domain for component longevity model(s) 210. For instance, vehicle usage model 230 may process operating data 202, vehicle usage data 220, or both to recognize anomalous patterns. Based on recognizing an anomalous pattern, vehicle usage model 230 may override component longevity model(s) 210. For instance, a detection of an anomalous pattern can indicate that a failure has occurred or is starting to occur.

Prognosis data 240 may be or include an effective longevity value. Prognosis data 240 may be or include an effective remaining useful life for a component of subsystem when used by a particular user.

Prognosis data 240 may include mitigation instructions for implementing a corrective action for the vehicle. Mitigation instructions may provide instructions to be executed by a vehicle computing system to mitigate a potential component failure. For instance, mitigation instructions may be configured to cause the vehicle to change a drive mode (e.g., locking out a "sport" mode to ensure gentler acceleration, etc.). Mitigation instructions may be configured to cause the vehicle to display a warning signal (e.g., a warning light on a dashboard, a warning message sent to a user device, an audible warning message output by speaker drivers, etc.). Mitigation instructions can be imperceptible to a user, such as instructions which cause the vehicle computing system to alter an operating condition of a component under analysis.

Mitigation instructions may trigger an upload of the health status of the component(s) to a remote server. For instance, a remote server may manage inventory and logistics for replacement components and service appointments. The remote server may receive notice from the vehicle based on mitigation instructions. The remote server may update an inventory or logistics accordingly based on a projected need for servicing the component. The remote server may initiate contact with one or more users associated with the vehicle (e.g., a driver, a fleet manager, etc.) to alert the user regarding the component. For instance, an alert describing prognosis data 240 may be issued electronically via a mobile application, email, SMS message, or the like. Prognosis data 240 may include a recommended maintenance interval. Prognosis data 240 may include a recommended maintenance time or location based on an expected amount or location of use of the vehicle by the user.

Figure 4:
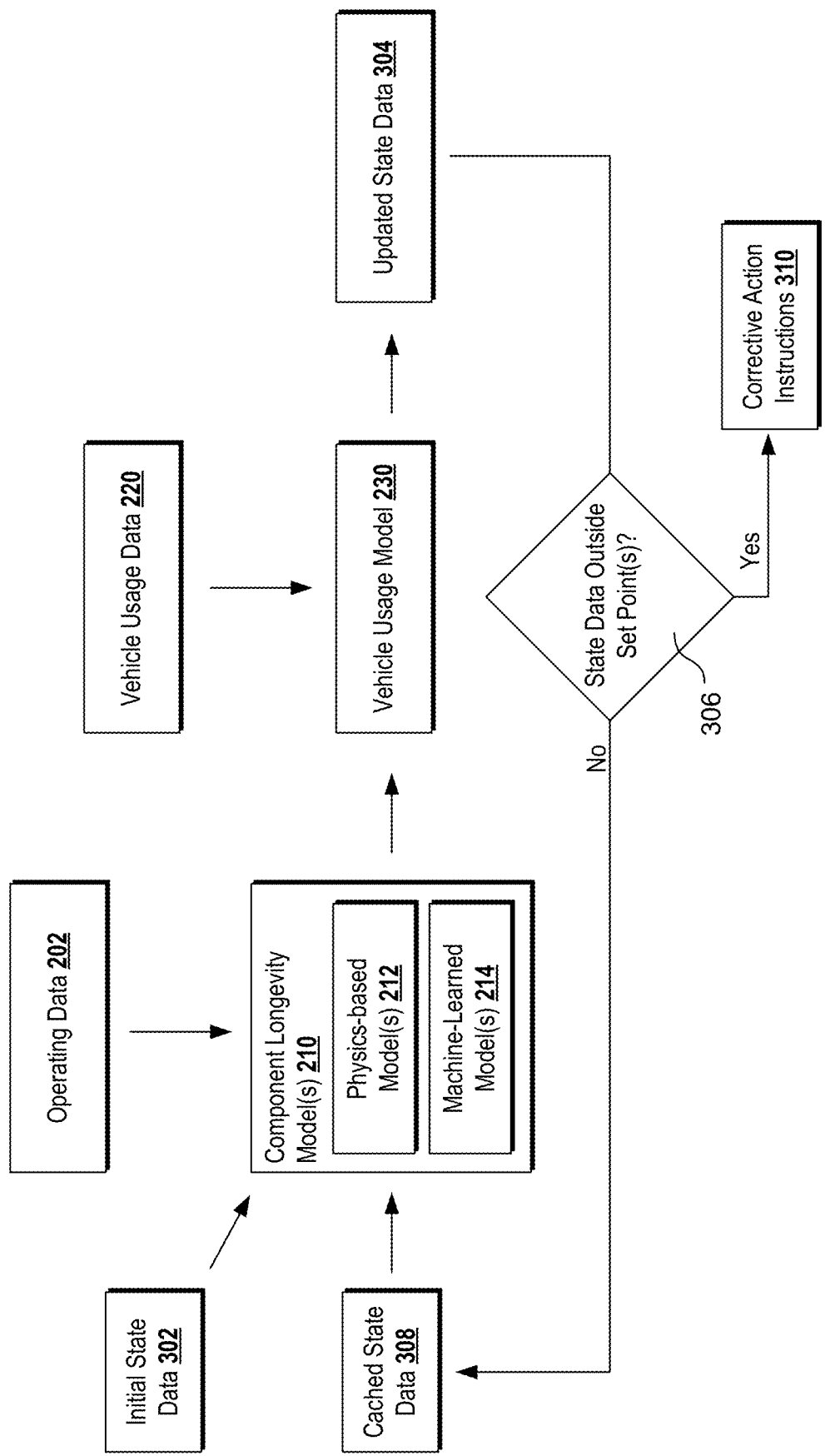
FIG. 4 illustrates a diagram of an example data processing pipeline according to example implementations of the present disclosure.

FIG. 4 illustrates an example data processing pipeline for iterative vehicle component health monitoring according to example implementations of the present disclosure. As an example, data processing pipeline 200 may operate in a looped data flow. On initialization (e.g., when a component or a vehicle is new), initial state data 302 may provide a starting point for an initial health status (e.g., a longevity value, such as a remaining useful life). This initial state data 302 may be processed by component longevity model(s) 210 and vehicle usage model 230 to obtain updated state data 304. The updated state data 304 may be or include a downrated remaining useful life estimate.

Component longevity model(s) 210 and vehicle usage model 230 may be configured to receive an initial longevity value and generate a new, reduced longevity value. For instance, in a first stage component longevity model(s) 210 may be configured to generate an initial updated longevity value. In a second stage vehicle usage model 230 may be configured to generate an effective longevity value based on the initial updated longevity value. The effective longevity value may be based on the initial updated longevity value as applied in the context of particular usage patterns.

Updated state data 304 may pass to decision block 306. If the updated state data 304 for any particular component remains within predetermined set points (e.g., threshold remaining useful life), updated state data 304 may pass to be stored or cached as cached state data 308 for processing in a subsequent iteration.

Decision block 306 may be configured to trigger operations outside the monitoring loop. If the updated state data 304 is outside the predetermined set points, decision block 306 may trigger corrective action instructions 310.

Corrective action instructions 310 may include mitigation instructions. Mitigation instructions may provide instructions to be executed by a vehicle computing system to mitigate a potential component failure. For instance, mitigation instructions may be configured to cause the vehicle to change a drive mode (e.g., locking out a "sport" mode to ensure gentler acceleration, etc.). Mitigation instructions may be configured to cause the vehicle to display a warning signal (e.g., a warning light on a dashboard, a warning message sent to a user device, an audible warning message output by speaker drivers, etc.). Mitigation instructions may be imperceptible to a user, such as instructions which cause the vehicle computing system to alter an operating condition of a component under analysis.

Figure 5:
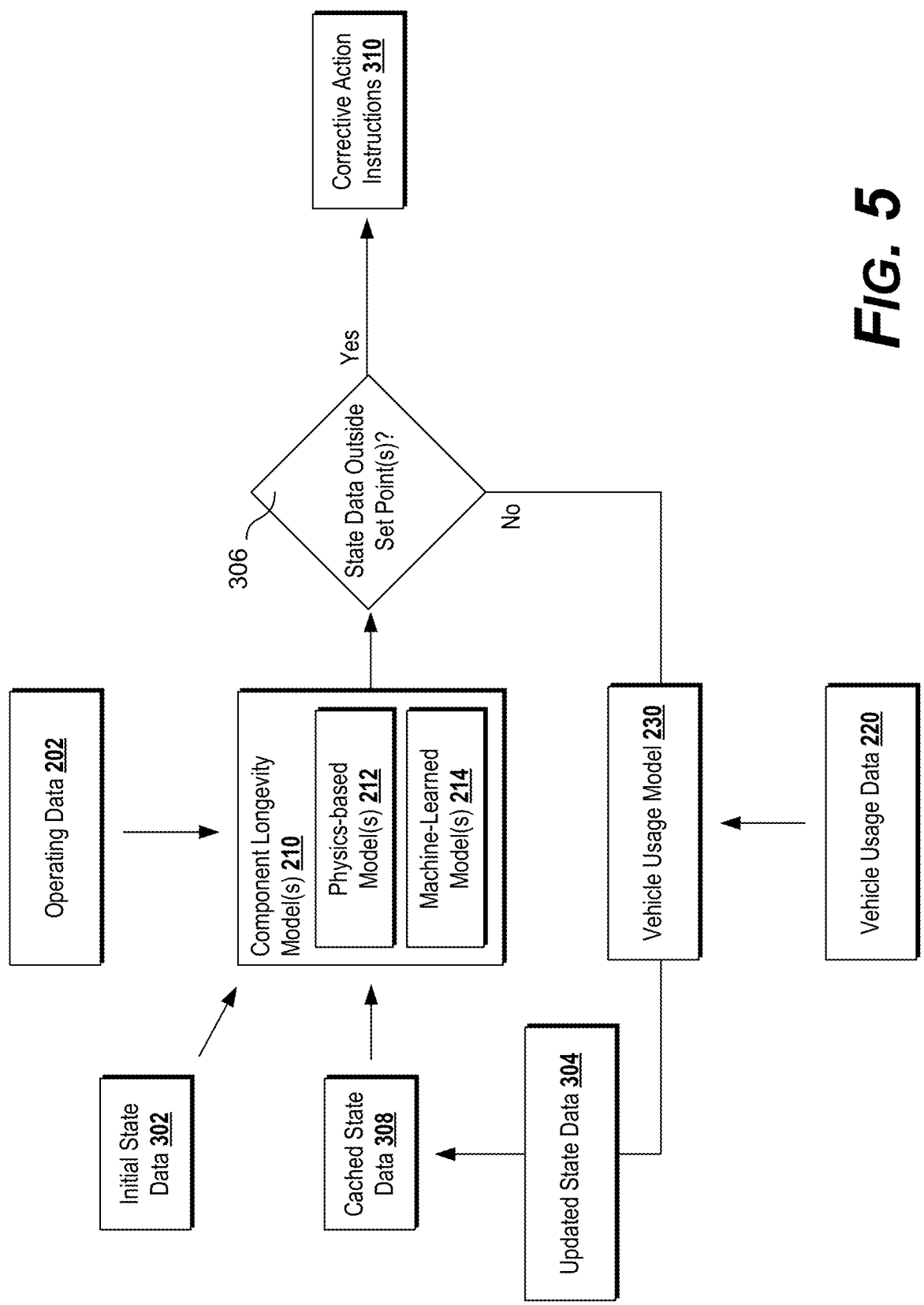
FIG. 5 illustrates a diagram of an example data processing pipeline according to example implementations of the present disclosure.

FIG. 5 illustrates an example data processing pipeline for iterative vehicle component health monitoring according to example implementations of the present disclosure. For instance, decision block 306 can operate directed on the output(s) of component longevity model(s) 210. If the initial updated component longevity value is within a predetermined set point, then monitoring may continue. An effective component longevity value may be output by vehicle usage model 230 and stored in a cache for future monitoring iterations. If the initial updated component longevity value is outside a predetermined set point, then decision block 306 may initiate corrective action instructions 310.

Figure 6:
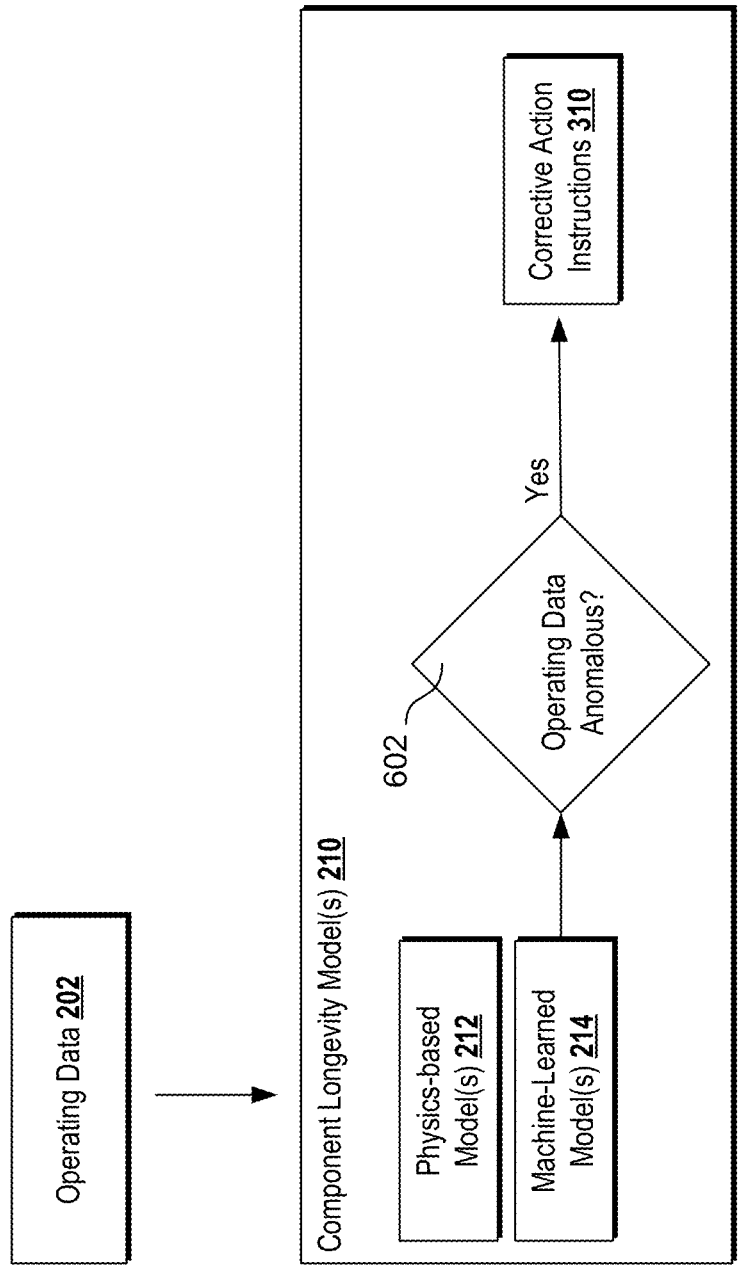
FIG. 6 illustrates a diagram of an example data processing pipeline according to example implementations of the present disclosure.

FIG. 6 illustrates an example configuration of component longevity model(s) 210. One or more of machine-learned model(s) 214 may monitor operating data for anomalous conditions. If anomalous conditions are detected to be outside a domain of validity for the component longevity model(s) 210, decision block 602 may trigger corrective action instructions 310 directly.

Similarly, with reference again to FIGS. 2 to 5, data processing pipeline 200 may recognize, using vehicle usage model 230, an anomalous usage pattern outside a domain of the component longevity model(s) 210. Data processing pipeline 200 may override, based on recognizing the anomalous usage pattern, the component longevity value with the prognosis.

For instance, anomalous conditions may be associated with decreased confidence or increased uncertainty for a current longevity value for a given component. Such decreased confidence or increased uncertainty may reach a point at which it is preferred to treat the component as if its longevity value were below predetermined set points (e.g., as in decision block 306). In an example, corrective action instructions 310 may include instructions configured to maintain operating data 202 within a valid domain. For instance, corrective action instructions 310 may cause the vehicle to have a reduced maximum speed, to have reduced motor torque available, to increase a cooling applied to a component, etc.

Figure 7:
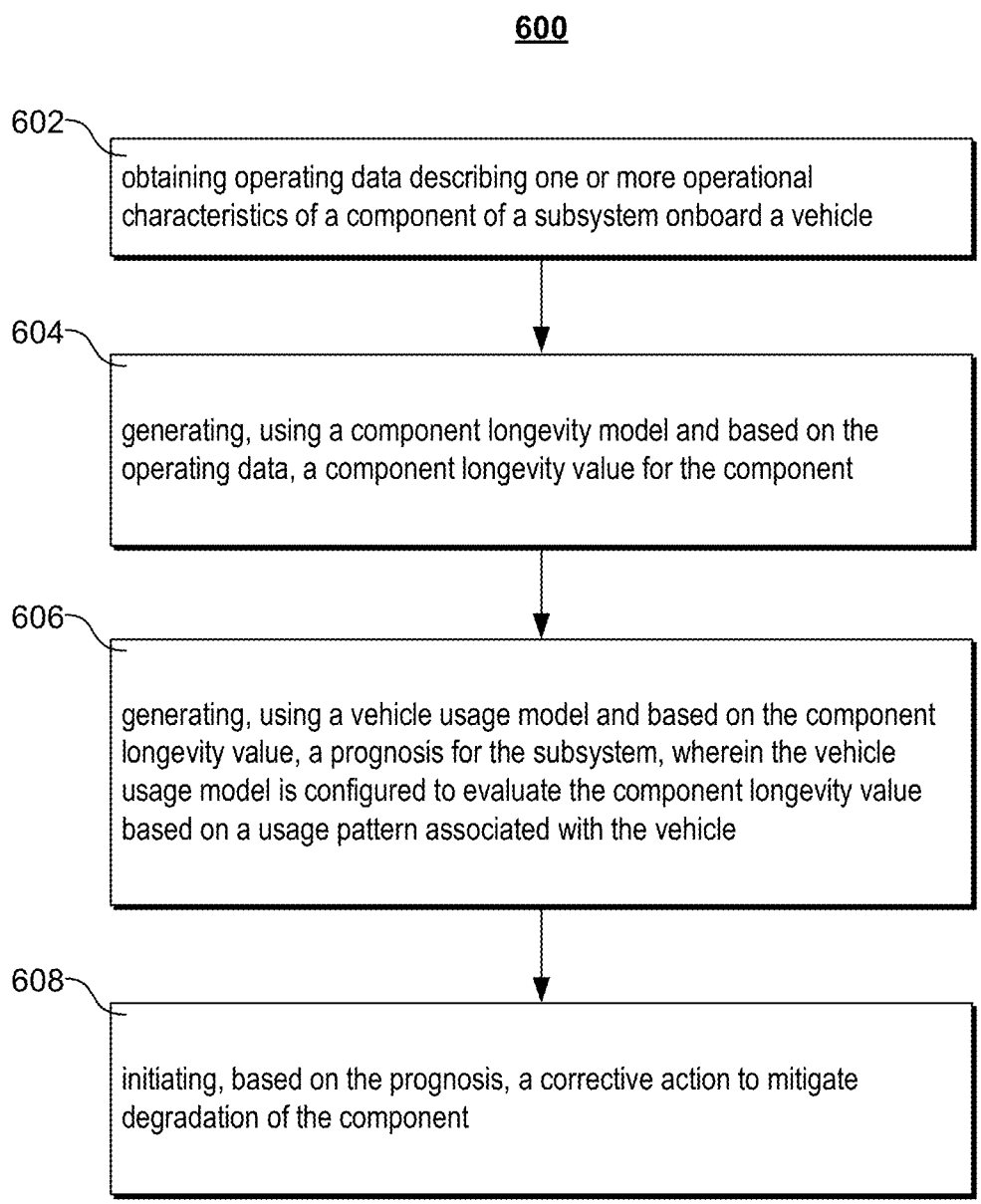
FIG. 7 illustrates a flowchart diagram of an example method for implementing example implementations of the present disclosure.

FIG. 7 illustrates a flowchart diagram of an example method 700 for vehicle component health monitoring according to example aspects of the present disclosure. The method 700 may be a computer-implemented method. The method 700 may be performed by a computing system described with reference to any one of the other figures. In an embodiment, the method 700 may be performed by the control circuit 135 of the computing system 130 of FIG. 1. One or more portions of the method 700 may be implemented as an algorithm on the hardware components of the devices described herein (e.g., as in FIGS. 1-5B, 8, etc.). For example, the steps of method 700 may be implemented as operations/instructions that are executable by computing hardware.

FIG. 7 illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 7 is described with reference to elements/terms described with respect to other systems and figures for example illustrated purposes and is not meant to be limiting. One or more portions of method 700 may be performed additionally, or alternatively, by other systems. For example, method 700 may be performed by a control circuit 185 of the computing platform 110.

In an embodiment, the method 700 may include a step 702, in which a computing system obtains operating data describing one or more operational characteristics of a component of a subsystem onboard a vehicle. For instance, the computing system may obtain operating data 202. Operating data may include substantially any measured, inferred, or generated data describing operational characteristics of a vehicle.

In an embodiment, the method 700 may include a step 704, in which a computing system generates, using a component longevity model and based on the operating data, a component longevity value for the component. For instance, the computing system may input operating data 202 to one or more component longevity model(s) 210 to generate a component longevity value for the component. Component longevity model(s) 210 may include physics-based models 212. Component longevity model(s) 210 may include machine-learned models 214. For instance, machine-learned model(s) 214 may include a machine-learned neural network trained to output an association between a set of input operational characteristics and one or more failure modes of the component. For example, a failure mode for an example active electrical component may include at least one of the following: (i) bond wire liftoff, (ii) dielectric breakdown, (iii) threshold voltage instability, or (iv) bias temperature instability. Each such failure mode may be recognizable from patterns in the operating data 202.

In an embodiment, the method 700 may include a step 706, in which a computing system generates, using a vehicle usage model and based on the component longevity value, a prognosis for the component. The vehicle usage model may be configured to evaluate the component longevity value based on a usage pattern associated with the vehicle. For instance, the computing system may input the output(s) of the component longevity model(s) 210 to vehicle usage model 230. Vehicle usage model 230 may generate a prognosis for the component based on the received outputs. Vehicle usage model 230 may generate the prognosis for the component based on the received outputs and vehicle usage data 220. In some implementations, the prognosis may be an effective longevity value for the subsystem.

In some implementations, the vehicle usage model may include a machine-learned neural network trained to recognize anomalous usage patterns of the vehicle based on the one or more operational characteristics (e.g., based on operating data 202, vehicle usage data 220, etc.). The computing system may recognize, using vehicle usage model 230, an anomalous usage pattern outside a domain of the component longevity model(s) 210. The computing system may override, based on recognizing the anomalous usage pattern, the component longevity value with the prognosis.

In some implementations, the vehicle usage model may include a machine-learned neural network trained to generate the effective longevity value based on a latent embedding of the usage pattern. The computing system may obtain the usage pattern from a database of usage patterns, the usage pattern stored in the database in association with a particular user of the vehicle.

In an embodiment, the method 700 may include a step 708, in which a computing system initiates, based on the prognosis, a corrective action to mitigate degradation of the component. Step 708 may include initiating a control signal configured to cause the vehicle to render a warning message to an occupant of the vehicle. Step 708 may include initiating a control signal configured to cause the vehicle to render a warning message to a user of the vehicle (e.g., a fleet manager not occupying the vehicle). Step 708 may include initiating a control signal configured to cause the vehicle to change a drive mode. Step 708 may include initiating a control signal configured to cause the vehicle to remain with an adjusted operating envelope, such as by reducing drive torque, engine RPM, top speed, etc. Step 708 may include initiating a control signal configured to cause the computing system to transmit, to a remote server, a message indicating the prognosis.

In some implementations of the method 700, the computing system may obtain an initial effective longevity value and generate, using the component longevity model(s) 210 and based on the operating data 202 and the initial effective longevity value, the component longevity value for the component. The computing system may iteratively update a storage location that stores the effective longevity value (e.g., cached state data 308).

In some implementations of the method 700, the computing system may, for each respective component of a plurality of components of the subsystem, obtain respective operating data describing one or more respective operational characteristics of the respective component of the plurality of components. The computing system may, for each respective component of a plurality of components of the subsystem, generate, using a respective component longevity model and based on the respective operating data, a respective component longevity value for the respective component. The computing system may generate, using the vehicle usage model and based on the plurality of respective component longevity values, a prognosis for the subsystem.

Figure 8:
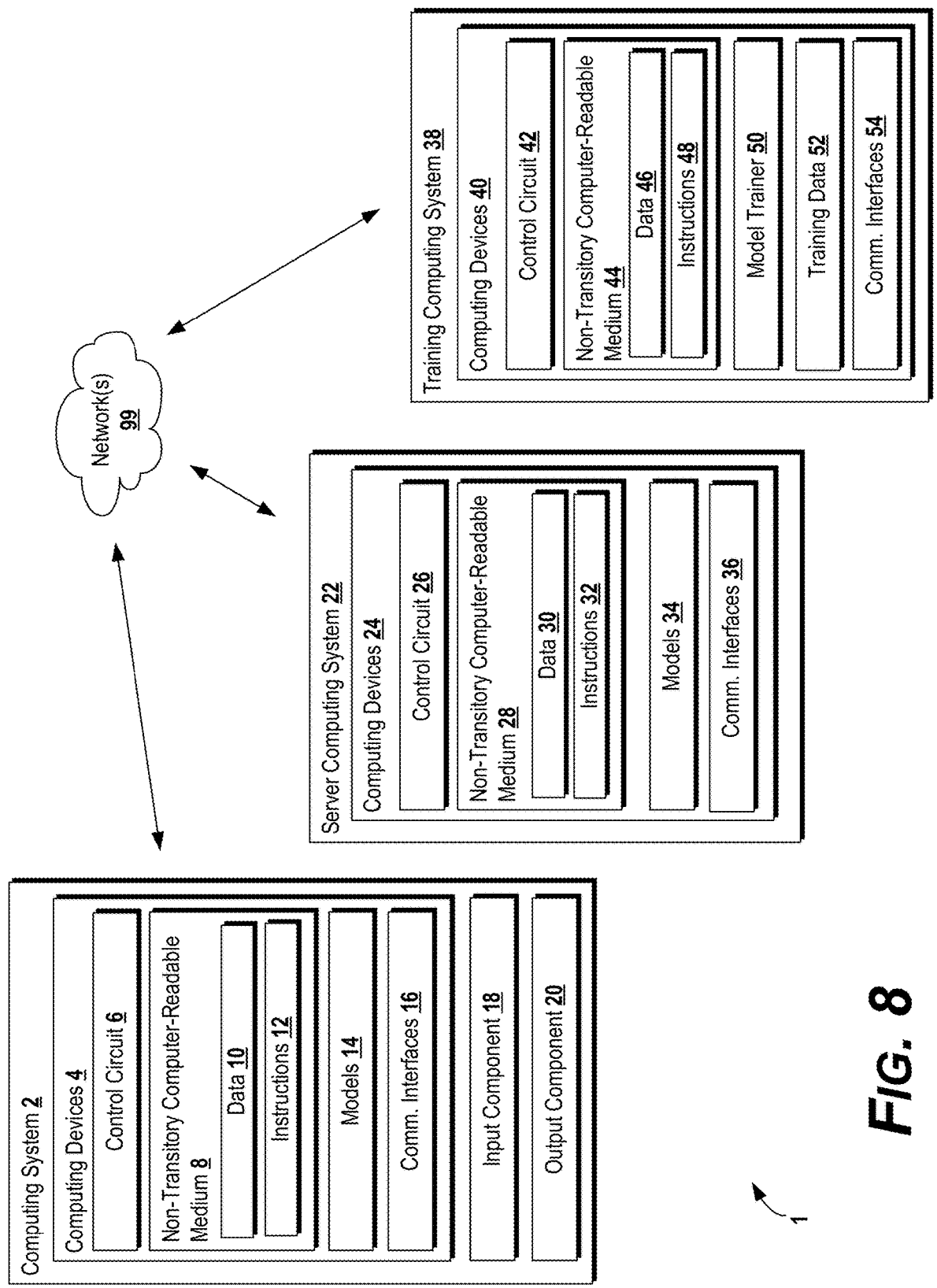
FIG. 8 illustrates a block diagram of an example computing system according to example implementations of the present disclosure.

FIG. 8 illustrates a block diagram of an example computing system 1 according to an embodiment hereof. The system 1 includes a computing system 2 (e.g., a computing system onboard a vehicle), a server computing system 22 (e.g., a remote computing system, cloud computing platform), and a training computing system 38 that are communicatively coupled over one or more networks 99.

The computing system 2 may include one or more computing devices 4 or circuitry. For instance, the computing system 4 may include a control circuit 6 and a non-transitory computer-readable medium 8, also referred to herein as memory. In an embodiment, the control circuit 6 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 6 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior & interior controller (CEIC), a zone controller, or any other controller. In an embodiment, the control circuit 6 may be programmed by one or more computer-readable or computer-executable instructions stored on the non-transitory computer-readable medium 8.

In an embodiment, the non-transitory computer-readable medium 8 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 8 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 8 may store information that may be accessed by the control circuit 6. For instance, the non-transitory computer-readable medium 8 (e.g., memory devices) may store data 10 that may be obtained, received, accessed, written, manipulated, created, and/or stored. The data 10 may include, for instance, any of the data or information described herein. In some implementations, the computing system 2 may obtain data from one or more memories that are remote from the computing system 2.

The non-transitory computer-readable medium 8 may also store computer-readable instructions 12 that may be executed by the control circuit 6. The instructions 12 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 6 to perform one or more functional tasks. The modules and computer-readable/executable instructions may be described as performing various operations or tasks when the control circuit 6 or other hardware component is executing the modules or computer-readable instructions.

The instructions 12 may be executed in logically and/or virtually separate threads on the control circuit 6. For example, the non-transitory computer-readable medium 8 may store instructions 12 that when executed by the control circuit 6 cause the control circuit 6 to perform any of the operations, methods and/or processes described herein. In some cases, the non-transitory computer-readable medium 8 may store computer-executable instructions or computer-readable instructions, such as instructions to perform at least a portion of the methods of FIG. 7.

In an embodiment, the computing system 2 may store or include one or more machine-learned models 14. For example, the machine-learned models 14 may be or may otherwise include various machine-learned models, including machine-learned model(s) 214 or machine-learned components of vehicle usage model 230. In an embodiment, the machine-learned models 14 may include an unsupervised learning model (e.g., for generating data clusters). In an embodiment, the machine-learned models 14 may include neural networks (e.g., deep neural networks) or other types of machine-learned models, including non-linear models and/or linear models. Neural networks may include feedforward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

In an embodiment, the one or more machine-learned models 14 may be received from the server computing system 22 over networks 99, stored in the computing system 2 (e.g., non-transitory computer-readable medium 8), and then used or otherwise implemented by the control circuit 6.

In an embodiment, the computing system 2 may implement multiple parallel instances of a single model.

Additionally, or alternatively, one or more machine-learned models 14 may be included in or otherwise stored and implemented by the server computing system 22 that communicates with the computing system 2 according to a client-server relationship. For example, the machine-learned models 14 may be implemented by the server computing system 22 as a portion of a web service. Thus, one or more models 14 may be stored and implemented at the computing system 2 and/or one or more models 14 may be stored and implemented at the server computing system 22.

The computing system 2 may include one or more communication interfaces 16. The communication interfaces 16 may be used to communicate with one or more other systems. The communication interfaces 16 may include any circuits, components, software, etc. for communicating via one or more networks (e.g., networks 99). In some implementations, the communication interfaces 16 may include for example, one or more of a communications controller, receiver, transceiver, transmitter, port, conductors, software and/or hardware for communicating data/information.

The computing system 2 may also include one or more user input components 18 that receives user input. For example, the user input component 18 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The computing system 2 may include one or more output components 20. The output components 20 may include hardware and/or software for audibly or visually producing content. For instance, the output components 20 may include one or more speakers, earpieces, headsets, handsets, etc. The output components 20 may include a display device, which may include hardware for displaying a user interface and/or messages for a user. By way of example, the output component 20 may include a display screen, CRT, LCD, plasma screen, touch screen, TV, projector, tablet, and/or other suitable display components.

The server computing system 22 may include one or more computing devices 24. In an embodiment, the server computing system 22 may include or is otherwise implemented by one or more server computing devices. In instances in which the server computing system 22 includes plural server computing devices, such server computing devices may operate according to sequential computing architectures, parallel computing architectures, or some combination thereof.

The server computing system 22 may include a control circuit 26 and a non-transitory computer-readable medium 28, also referred to herein as memory 28. In an embodiment, the control circuit 26 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 26 may be programmed by one or more computer-readable or computer-executable instructions stored on the non-transitory computer-readable medium 28.

In an embodiment, the non-transitory computer-readable medium 28 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 28 may store information that may be accessed by the control circuit 26. For instance, the non-transitory computer-readable medium 28 (e.g., memory devices) may store data 30 that may be obtained, received, accessed, written, manipulated, created, and/or stored. The data 30 may include, for instance, any of the data or information described herein. In some implementations, the server computing system 22 may obtain data from one or more memories that are remote from the server computing system 22.

The non-transitory computer-readable medium 28 may also store computer-readable instructions 32 that may be executed by the control circuit 26. The instructions 32 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 26 to perform one or more functional tasks. The modules and computer-readable/executable instructions may be described as performing various operations or tasks when the control circuit 26 or other hardware component is executing the modules or computer-readable instructions.

The instructions 32 may be executed in logically and/or virtually separate threads on the control circuit 26. For example, the non-transitory computer-readable medium 28 may store instructions 32 that when executed by the control circuit 26 cause the control circuit 26 to perform any of the operations, methods and/or processes described herein. In some cases, the non-transitory computer-readable medium 28 may store computer-executable instructions or computer-readable instructions, such as instructions to perform at least a portion of the methods of FIG. 7.

The server computing system 22 may store or otherwise include one or more machine-learned models 34, including machine-learned model(s) 214 or any machine-learned components of vehicle usage model 230. The machine-learned models 34 may include or be the same as the models 14 stored in computing system 2. In an embodiment, the machine-learned models 34 may include an unsupervised learning model. In an embodiment, the machine-learned models 34 may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

The machine-learned models described in this specification may have various types of input data and/or combinations thereof, representing data available to sensors and/or other systems onboard a vehicle. Input data may include, for example, latent encoding data (e.g., a latent space representation of an input, etc.), statistical data (e.g., data computed and/or calculated from some other data source), sensor data (e.g., raw and/or processed data captured by a sensor of the vehicle), or other types of data.

The server computing system 22 may include one or more communication interfaces 36. The communication interfaces 36 may be used to communicate with one or more other systems. The communication interfaces 36 may include any circuits, components, software, etc. for communicating via one or more networks (e.g., networks 99). In some implementations, the communication interfaces 36 may include for example, one or more of a communications controller, receiver, transceiver, transmitter, port, conductors, software and/or hardware for communicating data/information.

The computing system 2 and/or the server computing system 22 may train the models 14, 34 directly. The computing system 2 and/or the server computing system 22 may train the models 14, 34 via interaction with the training computing system 38 that may be communicatively coupled over the networks 99. The training computing system 38 may be separate from the server computing system 22 or may be a portion of or implemented by the server computing system 22. The training computing system 38 may be separate from the computing system 2 or may be a portion of or implemented by computing system 2.

The training computing system 38 may include one or more computing devices 40. In an embodiment, the training computing system 38 may include or is otherwise implemented by one or more server computing devices. In instances in which the training computing system 38 includes plural server computing devices, such server computing devices may operate according to sequential computing architectures, parallel computing architectures, or some combination thereof.

The training computing system 38 may include a control circuit 42 and a non-transitory computer-readable medium 44, also referred to herein as memory 44. In an embodiment, the control circuit 42 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 42 may be programmed by one or more computer-readable or computer-executable instructions stored on the non-transitory computer-readable medium 44.

In an embodiment, the non-transitory computer-readable medium 44 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 44 may store information that may be accessed by the control circuit 42. For instance, the non-transitory computer-readable medium 44 (e.g., memory devices) may store data 46 that may be obtained, received, accessed, written, manipulated, created, and/or stored. The data 46 may include, for instance, any of the data or information described herein. In some implementations, the training computing system 38 may obtain data from one or more memories that are remote from the training computing system 38.

The non-transitory computer-readable medium 44 may also store computer-readable instructions 48 that may be executed by the control circuit 42. The instructions 48 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 42 to perform one or more functional tasks. The modules and computer-readable/executable instructions may be described as performing various operations or tasks when the control circuit 42 or other hardware component is executing the modules or computer-readable instructions.

The instructions 48 may be executed in logically or virtually separate threads on the control circuit 42. For example, the non-transitory computer-readable medium 44 may store instructions 48 that when executed by the control circuit 42 cause the control circuit 42 to perform any of the operations, methods and/or processes described herein. In some cases, the non-transitory computer-readable medium 44 may store computer-executable instructions or computer-readable instructions, such as instructions to perform at least a portion of the methods of FIG. 7.

The training computing system 38 may include a model trainer 50 that trains the machine-learned models 14, 34 stored at the computing system 2 and/or the server computing system 22 using various training or learning techniques.

Model trainer 50 may train the models 14, 34 in a continuous, online fashion. Models 14, 34 may constantly be learning as they are deployed on computing system 2, server computing system 22. For instance, models 14, 34 may include machine-learned models 214 or vehicle usage model 230, which may be constantly learning from operating data 202 to detect component degradation, anomalous conditions, and the like.

Model trainer 50 may train the models 14, 34 in batch or in an offline fashion. For instance, model trainer 50 may train models 14, 34 in batch initially for later online fine-tuning.

Model trainer 50 may train the models 14, 34 in an unsupervised fashion. As such, the models may be effectively trained using unlabeled data for particular applications or problem domains (e.g., detecting anomalous patterns of usage or operation), which improves performance and adaptability of the models. The model trainer may train the models 14, 34 in a supervised fashion. The model trainer may train the models 14, 34 using reinforcement learning (e.g., with a reward based on improved reliability, uptime, minimized disruptions of operation, etc.).

Model trainer 50 may train machine-learned model(s) 14, 34 in a supervised manner. For instance, an example machine-learned model 14, 34 may be a model configured to process a voltage waveform measured at a pin of a transistor (e.g., a sliding window over a time history of the waveform) and output a label (e.g., "healthy," "degrading," "degraded," etc.). Training data for training the example model may include waveforms of measurements known to be associated with components that are healthy, degrading, degraded, etc. Comparison of the outputs of the example model when given the training inputs may indicate an error or loss. The computing system may update one or more parameters of the example model to train the model to better predict the health status of a device under test.

Model trainer 50 may train machine-learned model(s) 14, 34 in an unsupervised manner. For instance, an example machine-learned model 14, 34 may be a model configured to learn to recognize anomalous behavior of a component. An example machine-learned model 214 may be a clustering model configured to continuously learn groupings of observed data points. Data points that lie a threshold distance from the clustered points may be determined to be anomalous.

In an example, the model trainer 50 may backpropagate a loss or reward function through a model being trained to modify the parameters (e.g., weights) of the model. The model trainer 50 may continue to backpropagate the loss or reward function through the machine-learned model, with or without modification of the parameters (e.g., weights) of the model. For instance, the model trainer 50 may perform a gradient descent technique in which parameters of the machine-learned model may be modified in a direction of a negative gradient of the loss or reward function.

The model trainer 50 may utilize training techniques, such as backwards propagation of errors. For example, a loss function may be backpropagated through a model to update one or more parameters of the models (e.g., based on a gradient of the loss function). Various loss functions may be used such as mean squared error, likelihood loss, cross entropy loss, hinge loss, and/or various other loss functions. Gradient descent techniques may be used to iteratively update the parameters over a number of training iterations.

In an embodiment, performing backwards propagation of errors may include performing truncated backpropagation through time. The model trainer 50 may perform a number of generalization techniques (e.g., weight decays, dropouts, etc.) to improve the generalization capability of a model being trained. In particular, the model trainer 50 may train the machine-learned models 14, 34 based on a set of training data 52.

The training data 52 may include unlabeled training data for training in an unsupervised fashion. In an example, the training data 52 may include labeled or unlabeled sets of operating data indicative of measured characteristics of components of a vehicle.

In an embodiment, if the user has provided consent/authorization, training examples may be provided by the computing system 2 (e.g., of the user's vehicle). Thus, in such implementations, a model 14 provided to the computing system 2 may be trained by the training computing system 38 in a manner to personalize the model 14.

The model trainer 50 may include computer logic utilized to provide desired functionality. The model trainer 50 may be implemented in hardware, firmware, and/or software controlling a general-purpose processor. For example, in an embodiment, the model trainer 50 may include program files stored on a storage device, loaded into a memory and executed by one or more processors. In other implementations, the model trainer 50 may include one or more sets of computer-executable instructions that are stored in a tangible computer-readable storage medium such as RAM, hard disk, or optical or magnetic media.

The training computing system 38 may include one or more communication interfaces 54. The communication interfaces 54 may be used to communicate with one or more other systems. The communication interfaces 54 may include any circuits, components, software, etc. for communicating via one or more networks (e.g., networks 99). In some implementations, the communication interfaces 54 may include for example, one or more of a communications controller, receiver, transceiver, transmitter, port, conductors, software and/or hardware for communicating data/information.

The one or more networks 99 may be any type of communications network, such as a local area network (e.g., intranet), wide area network (e.g., Internet), or some combination thereof and may include any number of wired or wireless links. In general, communication over a network 99 may be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 8 illustrates one example computing system that may be used to implement the present disclosure. Other computing systems may be used as well. For example, in an embodiment, the computing system 2 may include the model trainer 50 and the training dataset 52. In such implementations, the models 14, 34 may be both trained and used locally at the computing system 2. In some of such implementations, the computing system 2 may implement the model trainer 50 to personalize the models 14, 34.

Additional Discussion of Various Embodiments

Embodiment 1 relates to a computing system. The computing system may include a control circuit. The control circuit may be configured to obtain operating data describing one or more operational characteristics of a component of a subsystem onboard a vehicle. The control circuit may be configured to generate, using a component longevity model and based on the operating data, a component longevity value for the component. The control circuit may be configured to generate, using a vehicle usage model and based on the component longevity value, a prognosis for the component, wherein the vehicle usage model is configured to evaluate the component longevity value based on a usage pattern associated with the vehicle. The control circuit may be configured to initiate, based on the prognosis, a corrective action to mitigate degradation of the component.

Embodiment 2 includes the computing system of Embodiment 1. In this embodiment, the prognosis comprises an effective longevity value for the component.

Embodiment 3 includes the computing system of Embodiment 2. In this embodiment, the control circuit may be configured to obtain an initial effective longevity value; and generate, using the component longevity model and based on the operating data and the initial effective longevity value, the component longevity value for the component.

Embodiment 4 includes the computing system of Embodiment 3. In this embodiment, the control circuit may be configured to iteratively update a storage location that stores the effective longevity value.

Embodiment 5 includes the computing system of any of Embodiments 1 to 4. In this embodiment, the component longevity model comprises a physics-based model.

Embodiment 6 includes the computing system of any of Embodiments 1 to 5. In this embodiment, the component longevity model comprises a machine-learned neural network trained to output an association between a set of input operational characteristics and one or more failure modes of the component.

Embodiment 7 includes the computing system of Embodiment 6. In this embodiment, the component is an active electrical component, and wherein the one or more failure modes comprises at least one of the following: (i) bond wire liftoff, (ii) dielectric breakdown, (iii) threshold voltage instability, or (iv) bias temperature instability.

Embodiment 8 includes the computing system of any of Embodiments 1 to 7. In this embodiment, the control circuit may be configured to: for each respective component of a plurality of components of the subsystem, obtain respective operating data describing one or more respective operational characteristics of the respective component of the plurality of components and generate, using a respective component longevity model and based on the respective operating data, a respective component longevity value for the respective component; and generate, using the vehicle usage model and based on the plurality of respective component longevity values, a prognosis for the subsystem.

Embodiment 9 includes the computing system of any of Embodiments 1 to 8. In this embodiment, the vehicle usage model comprises a machine-learned neural network trained to generate the effective longevity value based on a latent embedding of the usage pattern.

Embodiment 10 includes the computing system of any of Embodiments 1 to 9. In this embodiment, the control circuit may be configured to obtain the usage pattern from a database of usage patterns, the usage pattern stored in the database in association with a particular user of the vehicle.

Embodiment 11 includes the computing system of any of Embodiments 1 to 10. In this embodiment, the vehicle usage model comprises a machine-learned neural network trained to recognize anomalous usage patterns of the vehicle based on the one or more operational characteristics, and the control circuit may be configured to: recognize, using the vehicle usage model, an anomalous usage pattern outside a domain of the component longevity model; and override, based on recognizing the anomalous usage pattern, the component longevity value with the prognosis.

Embodiment 12 includes the computing system of any of Embodiments 1 to 11. In this embodiment, initiating, based on the prognosis, the corrective action comprises initiating a control signal configured to cause the vehicle to render a warning message to an occupant of the vehicle.

Embodiment 13 includes the computing system of any of Embodiments 1 to 12. In this embodiment, initiating, based on the prognosis, the corrective action comprises transmitting, to a remote server, a message indicating the prognosis.

Embodiment 14 relates to a method for monitoring an operational health of a vehicle subsystem. The method may be a computer-implemented method. The method may include obtaining operating data describing one or more operational characteristics of a component of a subsystem onboard a vehicle. The method may include generating, using a component longevity model and based on the operating data, a component longevity value for the component. The method may include generating, using a vehicle usage model and based on the component longevity value, a prognosis for the component, wherein the vehicle usage model is configured to evaluate the component longevity value based on a usage pattern associated with the vehicle. The method may include initiating, based on the prognosis, a corrective action to mitigate degradation of the component.

Embodiment 15 includes the method of Embodiment 14. In this embodiment, the prognosis comprises an effective longevity value for the component.

Embodiment 16 includes the method of Embodiment 15. In this embodiment, the method may include obtaining an initial effective longevity value and generating, using the component longevity model and based on the operating data and the initial effective longevity value, the component longevity value for the component.

Embodiment 17 includes the method of Embodiment 16. In this embodiment, the method may include iteratively updating a storage location that stores the effective longevity value.

Embodiment 18 includes the method of any of Embodiments 14 to 17. In this embodiment, the component longevity model comprises a physics-based model.

Embodiment 19 includes the method of any of Embodiments 14 to 18. In this embodiment, the component longevity model comprises a machine-learned neural network trained to output an association between a set of input operational characteristics and one or more failure modes of the component.

Embodiment 20 includes the method of any of Embodiments 14 to 19. In this embodiment, the component is an active electrical component, and wherein the one or more failure modes comprises at least one of the following: (i) bond wire liftoff, (ii) dielectric breakdown, (iii) threshold voltage instability, or (iv) bias temperature instability.

Embodiment 21 includes the method of any of Embodiments 14 to 20. In this embodiment, the method may include: for each respective component of a plurality of components of the subsystem, obtaining respective operating data describing one or more respective operational characteristics of the respective component of the plurality of components and generating, using a respective component longevity model and based on the respective operating data, a respective component longevity value for the respective component; and generating, using the vehicle usage model and based on the plurality of respective component longevity values, a prognosis for the subsystem.

Embodiment 22 includes the method of any of Embodiments 14 to 21. In this embodiment, the vehicle usage model comprises a machine-learned neural network trained to generate the effective longevity value based on a latent embedding of the usage pattern.

Embodiment 23 includes the method of any of Embodiments 14 to 22. In this embodiment, the method may include obtaining the usage pattern from a database of usage patterns, the usage pattern stored in the database in association with a particular user of the vehicle.

Embodiment 24 includes the method of any of Embodiments 14 to 23. In this embodiment, the vehicle usage model comprises a machine-learned neural network trained to recognize anomalous usage patterns of the vehicle based on the one or more operational characteristics, and the method may include: recognizing, using the vehicle usage model, an anomalous usage pattern outside a domain of the component longevity model; and overriding, based on recognizing the anomalous usage pattern, the component longevity value with the prognosis.

Embodiment 25 includes the method of any of Embodiments 14 to 24. In this embodiment, initiating, based on the prognosis, the corrective action comprises initiating a control signal configured to cause the vehicle to render a warning message to an occupant of the vehicle.

Embodiment 26 includes the method of any of Embodiments 14 to 25. In this embodiment, initiating, based on the prognosis, the corrective action comprises transmitting, to a remote server, a message indicating the prognosis.

Embodiment 27 relates to one or more non-transitory computer-readable media that store instructions that are executable by a control circuit to perform operations. In this embodiment, the one or more non-transitory computer-readable media store instructions that are executable by a control circuit to obtain operating data describing one or more operational characteristics of a component of a subsystem onboard a vehicle. The one or more non-transitory computer-readable media store instructions that are executable by a control circuit to generate, using a component longevity model and based on the operating data, a component longevity value for the component. The one or more non-transitory computer-readable media store instructions that are executable by a control circuit to generate, using a vehicle usage model and based on the component longevity value, a prognosis for the component, wherein the vehicle usage model is configured to evaluate the component longevity value based on a usage pattern associated with the vehicle. The one or more non-transitory computer-readable media store instructions that are executable by a control circuit to initiate, based on the prognosis, a corrective action to mitigate degradation of the component.

Embodiment 28 includes the one or more non-transitory computer-readable media of Embodiment 27. In this embodiment, the prognosis comprises an effective longevity value for the component.

Embodiment 29 includes the one or more non-transitory computer-readable media of Embodiment 28. In this embodiment, the one or more non-transitory computer-readable media store instructions that are executable by a control circuit to obtain an initial effective longevity value; and generate, using the component longevity model and based on the operating data and the initial effective longevity value, the component longevity value for the component.

Embodiment 30 includes the one or more non-transitory computer-readable media of Embodiment 29. In this embodiment, the one or more non-transitory computer-readable media store instructions that are executable by a control circuit to iteratively update a storage location that stores the effective longevity value.

Embodiment 31 includes the one or more non-transitory computer-readable media of any of Embodiments 27 to 30. In this embodiment, the component longevity model comprises a physics-based model.

Embodiment 32 includes the one or more non-transitory computer-readable media of any of Embodiments 27 to 31. In this embodiment, the component longevity model comprises a machine-learned neural network trained to output an association between a set of input operational characteristics and one or more failure modes of the component.

Embodiment 33 includes the one or more non-transitory computer-readable media of Embodiment 32. In this embodiment, the component is an active electrical component, and wherein the one or more failure modes comprises at least one of the following: (i) bond wire liftoff, (ii) dielectric breakdown, (iii) threshold voltage instability, or (iv) bias temperature instability.

Embodiment 34 includes the one or more non-transitory computer-readable media of any of Embodiments 27 to 33. In this embodiment, the one or more non-transitory computer-readable media store instructions that are executable by a control circuit to: for each respective component of a plurality of components of the subsystem, obtain respective operating data describing one or more respective operational characteristics of the respective component of the plurality of components and generate, using a respective component longevity model and based on the respective operating data, a respective component longevity value for the respective component; and generate, using the vehicle usage model and based on the plurality of respective component longevity values, a prognosis for the subsystem.

Embodiment 35 includes the one or more non-transitory computer-readable media of any of Embodiments 27 to 34. In this embodiment, the vehicle usage model comprises a machine-learned neural network trained to generate the effective longevity value based on a latent embedding of the usage pattern.

Embodiment 36 includes the one or more non-transitory computer-readable media of any of Embodiments 27 to 25. In this embodiment, the one or more non-transitory computer-readable media store instructions that are executable by a control circuit to obtain the usage pattern from a database of usage patterns, the usage pattern stored in the database in association with a particular user of the vehicle.

Embodiment 37 includes the one or more non-transitory computer-readable media of any of Embodiments 27 to 36. In this embodiment, the vehicle usage model comprises a machine-learned neural network trained to recognize anomalous usage patterns of the vehicle based on the one or more operational characteristics, and the one or more non-transitory computer-readable media store instructions that are executable by a control circuit to: recognize, using the vehicle usage model, an anomalous usage pattern outside a domain of the component longevity model; and override, based on recognizing the anomalous usage pattern, the component longevity value with the prognosis.

Embodiment 38 includes the one or more non-transitory computer-readable media of any of Embodiments 27 to 37. In this embodiment, initiating, based on the prognosis, the corrective action comprises initiating a control signal configured to cause the vehicle to render a warning message to an occupant of the vehicle.

Embodiment 39 includes the one or more non-transitory computer-readable media of any of Embodiments 27 to 38. In this embodiment, initiating, based on the prognosis, the corrective action comprises transmitting, to a remote server, a message indicating the prognosis.

Additional Disclosure

As used herein, adjectives and their possessive forms are intended to be used interchangeably unless apparent otherwise from the context and/or expressly indicated. For instance, "component of a/the vehicle" may be used interchangeably with "vehicle component" where appropriate. Similarly, words, phrases, and other disclosure herein is intended to cover obvious variants and synonyms even if such variants and synonyms are not explicitly listed.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment may be used with another embodiment to yield a still further embodiment. Thus, it is intended that the present disclosure cover such alterations, variations, and equivalents.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the present disclosure. At times, elements may be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c), . . . , (i), (ii), (iii), . . . , etc. may be used to illustrate operations or different elements in a list. Such identifiers are provided for the ease of the reader and do not denote a particular order, importance, or priority of steps, operations, or elements. For instance, an operation illustrated by a list identifier of (a), (i), etc. may be performed before, after, or in parallel with another operation illustrated by a list identifier of (b), (ii), etc.

What is claimed is:

1. A computing system for monitoring an operational health of a vehicle subsystem, the computing system comprising:
a control circuit configured to:
obtain operating data describing one or more operational characteristics of a component of a subsystem onboard a vehicle;
generate, using a component longevity model and based on the operating data, a component longevity value for the component;
generate, using a vehicle usage model and based on the component longevity, value, a prognosis for the component, wherein the vehicle usage model is configured to evaluate the component longevity value based on a usage pattern associated with the vehicle, wherein the vehicle usage model comprises a machine-learned neural network trained to recognize anomalous usage patterns of the vehicle based on the one or more operational characteristics;
recognize, using the vehicle usage model, an anomalous usage pattern outside a domain of the component longevity model;
override, based on recognizing the anomalous usage pattern, the component longevity value with the prognosis; and
initiate, based on the prognosis, a corrective action to mitigate degradation of the component, wherein the corrective action comprises causing the vehicle to change a drive mode.

2. The computing system of claim 1, wherein the prognosis comprises an effective longevity value for the component.

3. The computing system of claim 2, wherein the control circuit is configured to:
obtain an initial effective longevity value; and
generate, using the component longevity model and based on the operating data and the initial effective longevity value, the component longevity value for the component.

4. The computing system of claim 3, wherein the control circuit is configured to:
iteratively update a storage location that stores the effective longevity value.

5. The computing system of claim 1, wherein the component longevity model comprises a physics-based model.

6. The computing system of claim 1, wherein the component longevity model comprises a machine-learned neural network trained to output an association between a set of input operational characteristics and one or more failure modes of the component.

7. The computing system of claim 6, wherein the component is an active electrical component, and wherein the one or more failure modes comprises at least one of the following: (i) bond wire liftoff, (ii) dielectric breakdown, (iii) threshold voltage instability, or (iv) bias temperature instability.

8. The computing system of claim 1, wherein the control circuit is configured to:
for each respective component of a plurality of components of the subsystem:
obtain respective operating data describing one or more respective operational characteristics of the respective component of the plurality of components; and generate, using a respective component longevity model and based on the respective operating data, a respective component longevity value for the respective component; and generate, using the vehicle usage model and based on the plurality of respective component longevity values, a prognosis for the subsystem.

9. The computing system of claim 2, wherein the vehicle usage model comprises a machine-learned neural network trained to generate the effective longevity value based on a latent embedding of the usage pattern.

10. The computing system of claim 1, wherein the control circuit is configured to:
obtain the usage pattern from a database of usage patterns, the usage pattern stored in the database in association with a particular user of the vehicle.

11. The computing system of claim 1, wherein initiating, based on the prognosis, the corrective action comprises:
initiating a control signal configured to cause the vehicle to render a warning message to an occupant of the vehicle.

12. The computing system of claim 1, wherein initiating, based on the prognosis, the corrective action comprises:
transmitting, to a remote server, a message indicating the prognosis.

13. The computing system of claim 1, wherein the corrective action is configured to reduce a load on the component.

14. A method for monitoring an operational health of a vehicle subsystem, the method comprising:
obtaining operating data describing one or more operational characteristics of a component of a subsystem onboard a vehicle;
generating, using a component longevity model and based on the operating data, a component longevity value for the component;
generating, using a vehicle usage model and based on the component longevity value, a prognosis for the component, wherein the vehicle usage model is configured to evaluate the component longevity value based on a usage pattern associated with the vehicle, wherein the vehicle usage model comprises a machine-learned neural network trained to recognize anomalous usage patterns of the vehicle based on the one or more operational characteristics;
recognizing, using the vehicle usage model, an anomalous usage pattern outside a domain of the component longevity model;
overriding, based on recognizing the anomalous usage pattern, the component longevity value with the prognosis; and
initiating, based on the prognosis, a corrective action to mitigate degradation of the component, wherein the corrective action comprises causing the vehicle to change a drive mode.

15. The method of claim 14, wherein the prognosis comprises an effective longevity value for the component, and the method comprises:

obtaining an initial effective longevity value; and
generating, using the component longevity model and based on the operating data and the initial effective longevity value, the component longevity value for the component.

16. The method of claim 14, wherein the component longevity model comprises a machine learned neural network trained to output an association between a set of input operational characteristics and one or more failure modes of the component.

17. The method of claim 14, comprising:
for each respective component of a plurality of components of the subsystem:
obtaining respective operating data describing one or more respective operational characteristics of the respective component of the plurality of components; and
generating, using a respective component longevity model and based on the respective operating data, a respective component longevity value for the respective component; and
generating, using the vehicle usage model and based on the plurality of respective component longevity values, a prognosis for the subsystem.

18. The method of claim 14, comprising:
obtaining the usage pattern from a database of usage patterns, the usage pattern stored in the database in association with a particular user of the vehicle.

19. The method of claim 14, wherein the corrective action is configured to reduce a load on the component.

20. One or more non-transitory computer-readable media that store instructions that are executable by a control circuit to:
obtain operating data describing one or more operational characteristics of a component of a subsystem onboard a vehicle;
generate, using a component longevity model and based on the operating data, a component longevity value for the component;
generate, using a vehicle usage model and based on the component longevity value, a prognosis for the component, wherein the vehicle usage model is configured to evaluate the component longevity value based on a usage pattern associated with the vehicle; wherein the vehicle usage model comprises a machine-learned neural network trained to recognize anomalous usage patterns of the vehicle based on the one or more operational characteristics;
recognize, using the vehicle usage model, an anomalous usage pattern outside a domain of the component longevity model;
override, based on recognizing the anomalous usage pattern, the component longevity value with the prognosis; and
initiate, based on the prognosis, a corrective action to mitigate degradation of the component, wherein the corrective action comprises causing the vehicle to change a drive mode.

* * * * *

UNITED STATES PATENT AND TRADEMARK OFFICE
CERTIFICATE OF CORRECTION

| | |
|---|---|
| PATENT NO. | : 12,073,668 B1 |
| APPLICATION NO. | : 18/331782 |
| DATED | : August 27, 2024 |
| INVENTOR(S) | : Mohamad Abdul-Hak and Agasthya Ayachit |

Page 1 of 1

It is certified that error appears in the above-identified patent and that said Letters Patent is hereby corrected as shown below:

In the Claims

Claim 1, Line 13, the "," appearing between the words "longevity" and "value" should be removed.

Signed and Sealed this
Twenty-eighth Day of October, 2025

John A. Squires
*Director of the United States Patent and Trademark Office*